US011778676B2

(12) United States Patent
Abedini et al.

(10) Patent No.: US 11,778,676 B2
(45) Date of Patent: Oct. 3, 2023

(54) SIMULTANEOUS COMMUNICATION CAPABILITY SIGNALING IN AN INTEGRATED ACCESS AND BACKHAUL NETWORK

(71) Applicant: QUALCOMM Incorporated, San Diego, CA (US)

(72) Inventors: Navid Abedini, Basking Ridge, NJ (US); Jianghong Luo, Skillman, NJ (US); Luca Blessent, Whitehouse Station, NJ (US); Tao Luo, San Diego, CA (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/110,548

(22) Filed: Dec. 3, 2020

(65) Prior Publication Data

US 2021/0185749 A1 Jun. 17, 2021

Related U.S. Application Data

(60) Provisional application No. 63/023,560, filed on May 12, 2020, provisional application No. 62/947,407, filed on Dec. 12, 2019.

(51) Int. Cl.
*H04W 76/15* (2018.01)
*H04W 8/24* (2009.01)
(Continued)

(52) U.S. Cl.
CPC ........... *H04W 76/15* (2018.02); *H04W 8/245* (2013.01); *H04W 72/1263* (2013.01); *H04W 72/23* (2023.01); *H04W 88/14* (2013.01)

(58) Field of Classification Search
CPC . H04W 76/15; H04W 8/245; H04W 72/1263; H04W 72/1289; H04W 88/14;
(Continued)

(56) References Cited

U.S. PATENT DOCUMENTS 11,553,496 B2 * 1/2023 Jyothi .................. H04W 28/16
2015/0103663 A1 4/2015 Amini et al.
(Continued)

FOREIGN PATENT DOCUMENTS

EP 3337284 A1 6/2018

OTHER PUBLICATIONS

Islam, Muhammad Nazmul, Sundar Subramanian, and Ashwin Sampath. "Integrated access backhaul in millimeter wave networks." 2017 IEEE Wireless Communications and Networking Conference (WCNC). IEEE, 2017 (Year: 2017).*
(Continued)

*Primary Examiner* — Sharad Rampuria
(74) *Attorney, Agent, or Firm* — Harrity & Harrity, LLP

(57) ABSTRACT

Various aspects of the present disclosure generally relate to wireless communication. In some aspects, a node in a wireless network may transmit an indication of a capability of the node for simultaneous communication with respect to at least one of: multiple parent nodes of the node, multiple mobile termination components of the node, multiple transmit receive points of the node, multiple cells of the node, or a combination thereof; and communicate with another node in the wireless network based at least in part on the capability. Numerous other aspects are provided.

35 Claims, 11 Drawing Sheets

(51) Int. Cl.

| | |
|---|---|
| ***H04W 72/1263*** | (2023.01) |
| ***H04W 88/14*** | (2009.01) |
| ***H04W 72/23*** | (2023.01) |

(58) Field of Classification Search

CPC ... H04W 16/10; H04W 72/048; H04W 92/20; H04W 88/085; H04W 48/08; H04W 84/047; H04W 8/24; H04W 72/04; H04W 72/12; H04W 76/00; H04B 7/2121; H04B 7/2123; H04J 2203/0069; H04Q 2213/394

See application file for complete search history.

(56) References Cited

U.S. PATENT DOCUMENTS

| | | | | |
|---|---|---|---|---|
| 2019/0014533 | A1* | 1/2019 | Abedini | H04W 16/10 |
| 2020/0052775 | A1* | 2/2020 | Nam | H04B 17/336 |
| 2020/0229181 | A1* | 7/2020 | Qi | H04W 88/14 |
| 2020/0337048 | A1* | 10/2020 | Abedini | H04W 72/23 |
| 2021/0345273 | A1* | 11/2021 | Xing | H04W 56/0015 |
| 2022/0278741 | A1* | 9/2022 | Dahlman | H04B 7/15542 |

OTHER PUBLICATIONS

Kyasanur, Pradeep, and Nitin H. Vaidya. "Routing and interface assignment in multi-channel multi-interface wireless networks." IEEE Wireless Communications and Networking Conference, 2005. vol. 4. IEEE, 2005. (Year: 2005).*

Olwal, Thomas O., Karim Djouani, and Anish M. Kurien. "A survey of resource management toward 5G radio access networks." IEEE Communications Surveys & Tutorials 18.3 (2016): 1656-1686. (Year: 2016).*

International Search Report and Written Opinion—PCT/US2020/063315—ISA/EPO—dated Mar. 24, 2021.

* cited by examiner

SIMULTANEOUS COMMUNICATION CAPABILITY SIGNALING IN AN INTEGRATED ACCESS AND BACKHAUL NETWORK

CROSS-REFERENCE TO RELATED APPLICATIONS

This Patent Application claims priority to Provisional Patent Application No. 62/947,407, filed on Dec. 12, 2019, entitled "SIMULTANEOUS COMMUNICATION CAPABILITY SIGNALING IN AN INTEGRATED ACCESS AND BACKHAUL NETWORK," and assigned to the assignee hereof. This Patent Application also claims priority to Provisional Patent Application No. 63/023,560, filed on May 12, 2020, entitled "SIMULTANEOUS COMMUNICATION CAPABILITY SIGNALING IN AN INTEGRATED ACCESS AND BACKHAUL NETWORK," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for simultaneous communication capability signaling in an integrated access and backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node in a wireless network, may include transmitting an indication of a capability of the node for simultaneous communication with respect to at least one of: multiple parent nodes of the node, multiple mobile termination components of the node, multiple transmit receive points of the node, multiple cells of the node, or a combination thereof; and communicating with another node in the wireless network based at least in part on the capability.

In some aspects, a method of wireless communication, performed by a control node in a wireless network, may include receiving an indication of a capability of a node in the wireless network for simultaneous communication with respect to at least one of: multiple parent nodes of the node, multiple mobile termination components of the node, multiple transmit receive points of the node, multiple cells of the node, or a combination thereof; and communicating with the node based at least in part on the capability.

In some aspects, a node for wireless communication may include memory and one or more processors operatively coupled to the memory. The memory and the one or more processors may be configured to transmit an indication of a capability of the node for simultaneous communication with respect to at least one of: multiple parent nodes of the node, multiple mobile termination components of the node, multiple transmit receive points of the node, multiple cells of the node, or a combination thereof; and communicate with another node in the wireless network based at least in part on the capability.

In some aspects, a control node for wireless communication may include memory and one or more processors operatively coupled to the memory. The memory and the one or more processors may be configured to receive an indication of a capability of a node in the wireless network for simultaneous communication with respect to at least one of: multiple parent nodes of the node, multiple mobile termination components of the node, multiple transmit receive points of the node, multiple cells of the node, or a combination thereof; and communicate with the node based at least in part on the capability.

In some aspects, a non-transitory computer-readable medium may store one or more instructions for wireless communication. The one or more instructions, when executed by one or more processors of a node, may cause the one or more processors to: transmit an indication of a capability of the node for simultaneous communication with respect to at least one of: multiple parent nodes of the node, multiple mobile termination components of the node, multiple transmit receive points of the node, multiple cells of the node, or a combination thereof; and communicate with another node in the wireless network based at least in part on the capability.

In some aspects, a non-transitory computer-readable medium may store one or more instructions for wireless communication. The one or more instructions, when executed by one or more processors of a control node, may cause the one or more processors to: receive an indication of a capability of a node in the wireless network for simultaneous communication with respect to at least one of: multiple parent nodes of the node, multiple mobile termination components of the node, multiple transmit receive points of the node, multiple cells of the node, or a combination thereof; and communicate with the node based at least in part on the capability.

In some aspects, a node in a wireless network may include means for transmitting an indication of a capability of the node for simultaneous communication with respect to at least one of: multiple parent nodes of the node, multiple mobile termination components of the node, multiple transmit receive points of the node, multiple cells of the node, or a combination thereof; and means for communicating with another node in the wireless network based at least in part on the capability.

In some aspects, a control node in a wireless network may include means for receiving an indication of a capability of a node in the wireless network for simultaneous communication with respect to at least one of: multiple parent nodes of the node, multiple mobile termination components of the node, multiple transmit receive points of the node, multiple cells of the node, or a combination thereof; and means for communicating with the node based at least in part on the capability.

Aspects generally include a method, apparatus, system, computer program product, non-transitory computer-readable medium, user equipment, base station, node, control node, integrated access and backhaul (IAB) node, IAB donor, parent node, child node, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
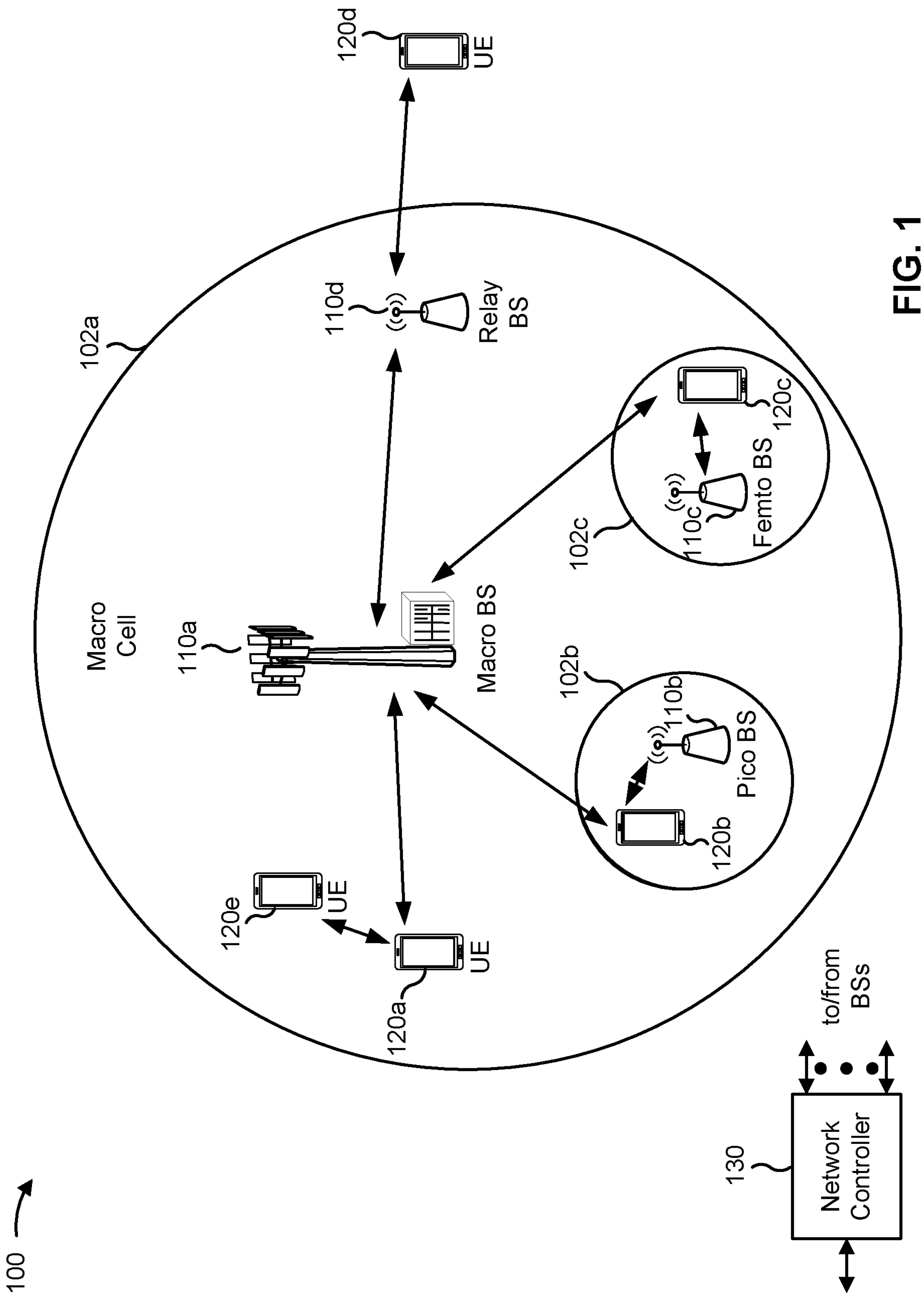
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
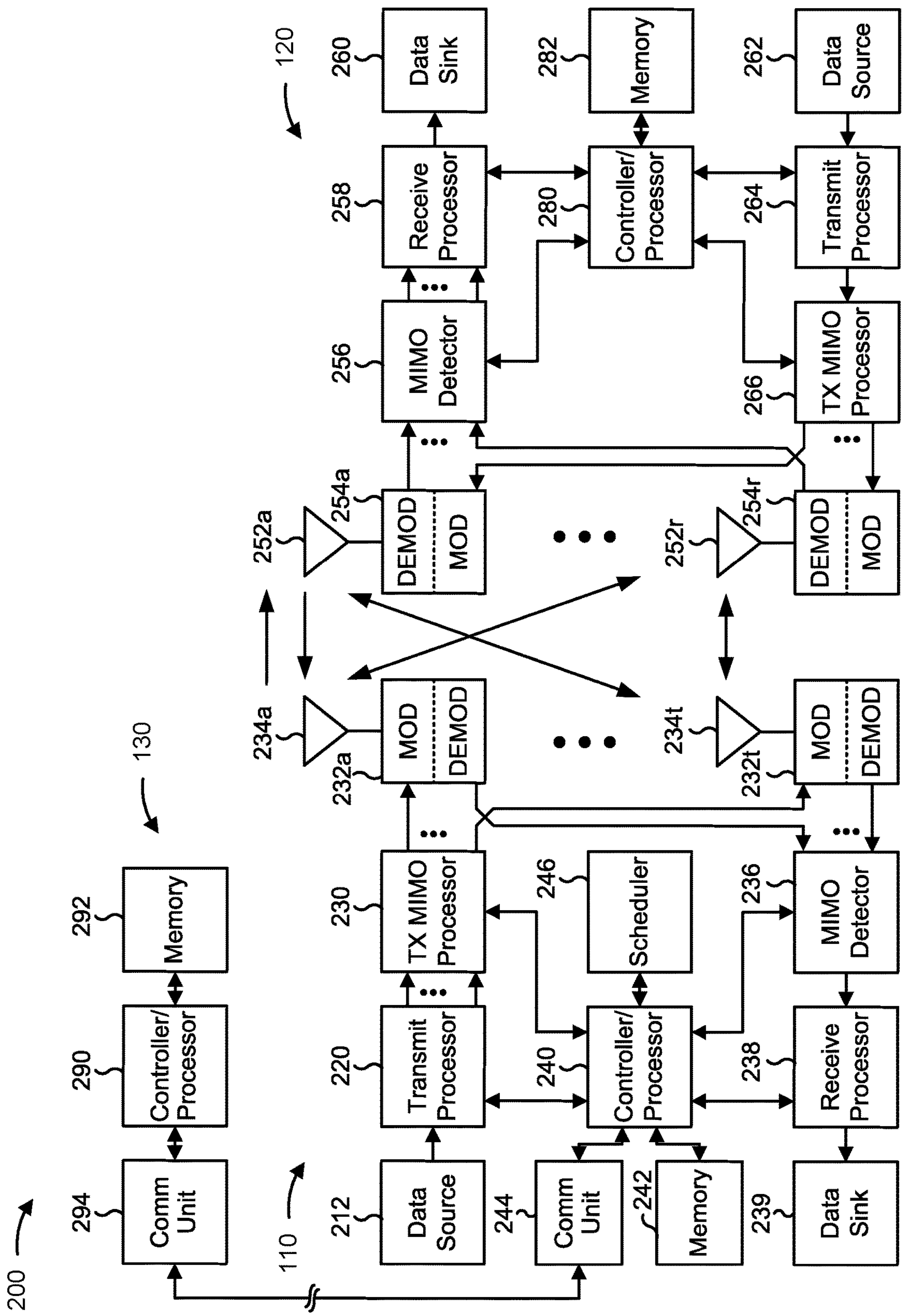
FIG. 2 is a diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with simultaneous communication capability signaling in an integrated access and backhaul (IAB) network, as described in more detail elsewhere herein. Additionally, or alternatively, a node in an IAB network (e.g., an IAB node, an IAB donor, a control node, a child node, a parent node, and/or the like) and/or a node in another type of wireless multi-hop network may perform one or more techniques associated with simultaneous communication capability signaling in an IAB network. As described in more detail elsewhere herein, such a node may include a mobile termination or a mobile terminal (MT) component and a distributed unit (DU) component. Additionally, or alternatively, a node (e.g., an IAB donor) may include a central unit (CU) component and a DU component. The MT component may perform one or more functions of a UE 120 described herein (e.g., in connection with FIGS. 1-3) and/or may include one or more components of a UE 120 described herein (e.g., in connection with FIG. 2). The DU component may perform one or more functions of a base station 110 described herein (e.g., in connection with FIGS. 1-3), such as scheduling, and/or may include one or more components of a base station 110 described herein (e.g., in connection with FIG. 2). The CU component may perform one or more functions of a base station 110 described herein (e.g., in connection with FIGS. 1-3), such as configuration for other nodes, and/or may include one or more components of a base station 110 described herein (e.g., in connection with FIG. 2).

Figure 10:
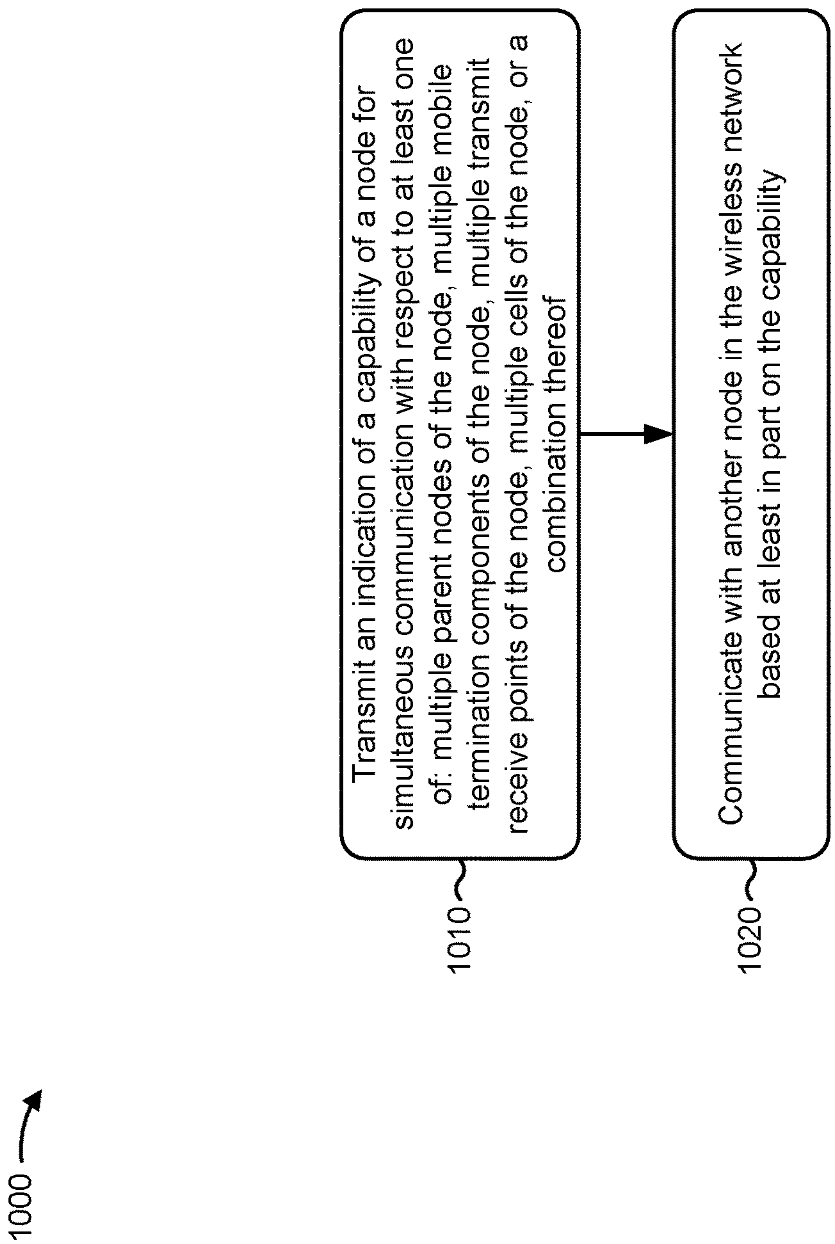
FIG. 10 is a diagram illustrating an example process performed, for example, by a node in an IAB network, in accordance with various aspects of the present disclosure.
Figure 11:
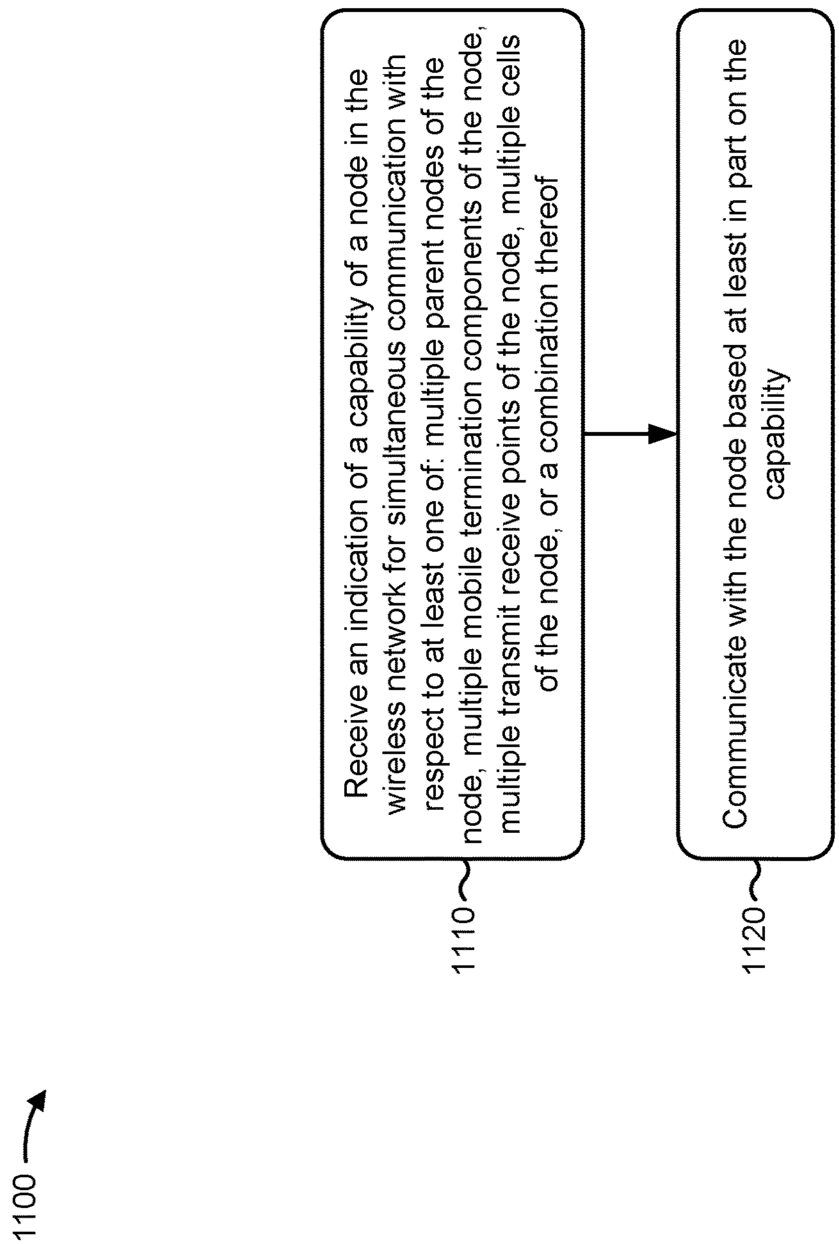
FIG. 11 is a diagram illustrating an example process performed, for example, by a control node in an IAB network, in accordance with various aspects of the present disclosure.

In some aspects, controller/processor 240 of base station 110 and/or a node, controller/processor 280 of UE 120 and/or a node, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1000 of FIG. 10, process 1100 of FIG. 11, and/or other processes as described herein. A scheduler 246 may schedule UEs for data transmission on the downlink and/or uplink.

In some aspects, a node may include means for transmitting an indication of a capability of the node for simultaneous communication with respect to at least one of: multiple parent nodes of the node, multiple mobile termination components of the node, multiple transmit receive points of the node, multiple cells of the node, or a combination thereof; means for communicating with another node in the wireless network based at least in part on the capability; and/or the like. In some aspects, such means may include one or more components of UE 120 and/or base station 110 (which may be included in the node) described in connection with FIG. 2.

In some aspects, a control node may include means for receiving an indication of a capability of a node in the wireless network for simultaneous communication with respect to at least one of: multiple parent nodes of the node, multiple mobile termination components of the node, multiple transmit receive points of the node, multiple cells of the node, or a combination thereof; means for communicating with the node based at least in part on the capability; and/or the like. In some aspects, such means may include one or more components of UE 120 and/or base station 110 (which may be included in the control node) described in connection with FIG. 2.

As indicated above, FIG. 2 is provided as an example. Other examples may differ from what is described with regard to FIG. 2.

Figure 3:
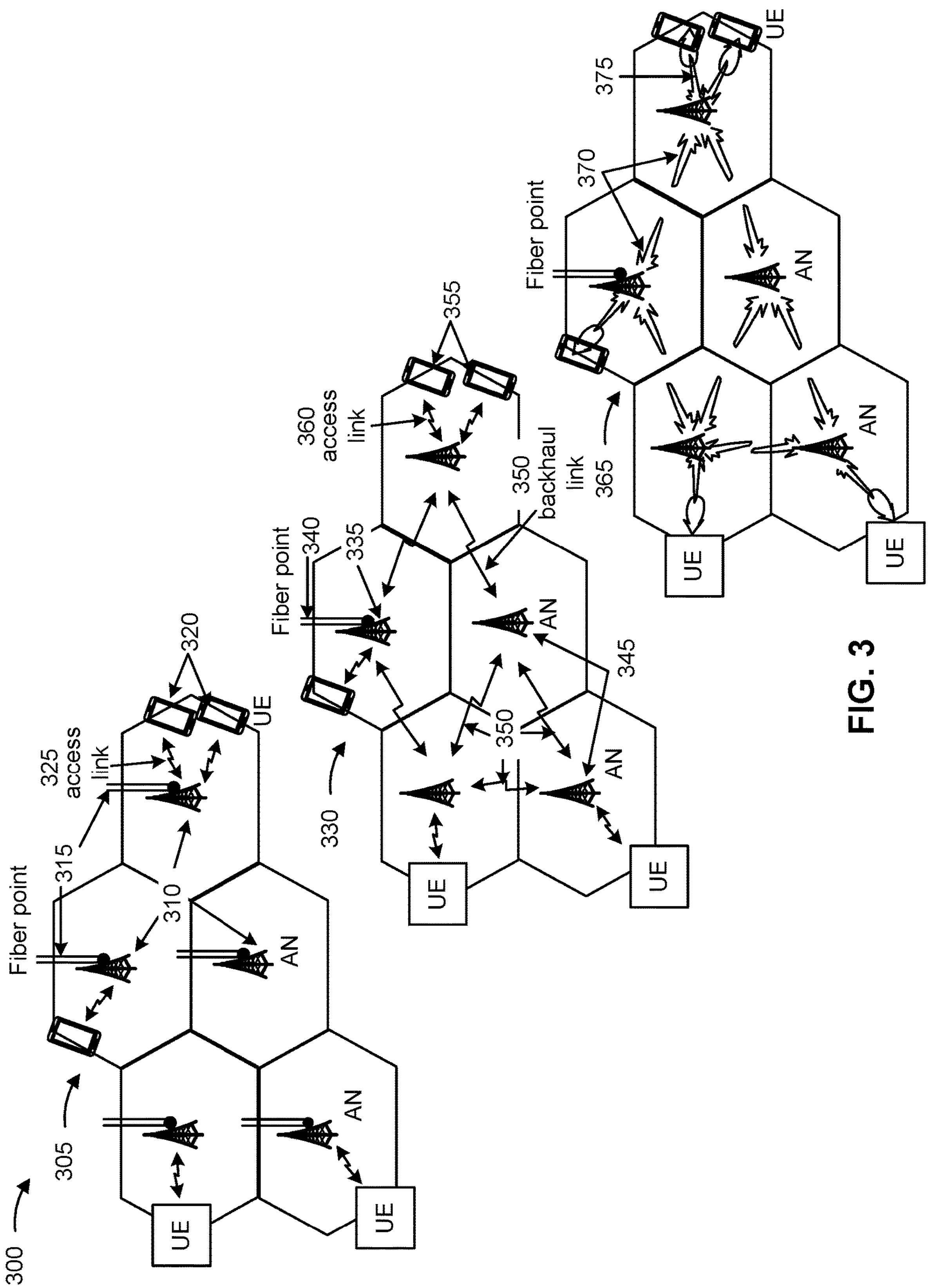
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1 and/or FIG. 2.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
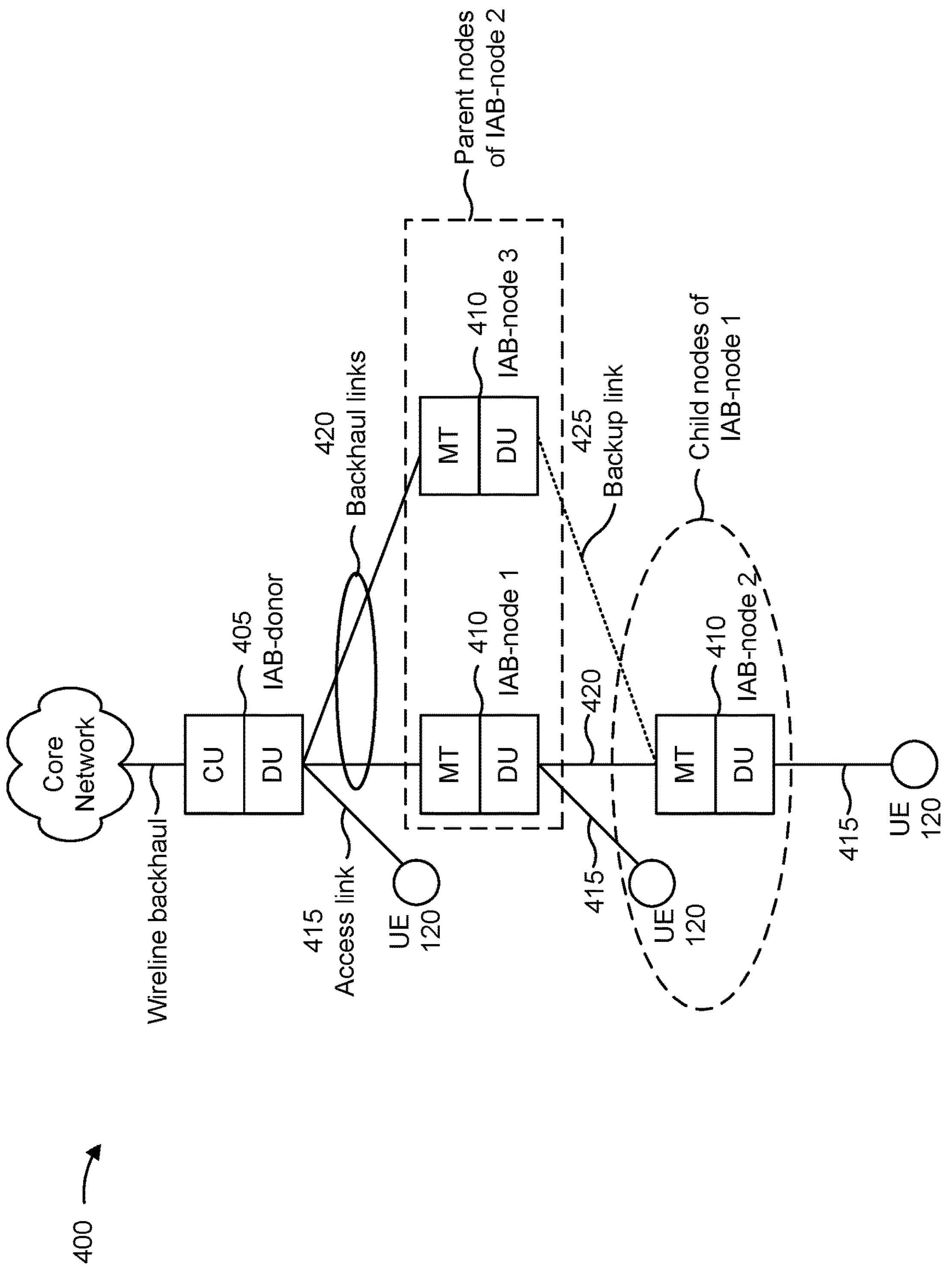
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (FLAP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

In an IAB network, network resources for wireless communications (e.g., time resources, frequency resources, spatial resources, and/or the like) may be shared between access links 415 and backhaul links 420. In some cases, a CU of an IAB donor 405 may configure resource patterns for IAB nodes 410 in the IAB network. For example, a time resource may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node (e.g., by a DU of the parent node). For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node). For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

In some cases, nodes of the IAB network are subject to a half-duplex constraint, meaning that a particular node cannot transmit and receive information at the same time (e.g., cannot concurrently or simultaneously communicate via an access link 415 of the node and a backhaul link 420 of the node). This constraint may lead to high latency for communications. To permit communication via both an access link 415 and backhaul link 420 of a node, the node may be configured with a resource allocation that uses time division multiplexing (TDM), where communications on the access link 415 and the backhaul link 420 are scheduled to occur at different times. However, this may increase latency of communication as compared to simultaneous communication via an access link 415 and a backhaul link 420.

In some cases, to reduce latency and/or improve reliability, an IAB node (e.g., a child node) may communicate with multiple parent nodes via corresponding multiple backhaul links 420. In some cases, the multiple backhaul links 420 are actively used to communicate, and none of the backhaul links 420 are used as a backup link 425 in the case of failure of one of the backhaul links 420. However, if TDM is used across multiple backhaul links 420 and one or more access links 415, latency may increase if simultaneous communication is not enabled across multiple links. Some techniques and apparatuses described herein enable an IAB node to simultaneously communicate via multiple links, such as multiple backhaul links 420, multiple access links 415, or one or more backhaul links 420 and one or more access links 415.

However, different IAB nodes may have different capabilities for simultaneous communication depending on an architecture and/or hardware configuration of the IAB node, such as whether the IAB node supports full duplex communication, a level of self-interference generated by transmissions of the IAB node, an ability of the IAB node to mitigate and/or cancel such self-interference (e.g., using filtering), a number of transmit chains and/or or receive chains of the IAB node, whether such transmit chains and/or receive chains are shared by multiple antennas of the IAB node, an operating frequency or bandwidth of the IAB node, a beam-forming capability or configuration of the IAB node, and/or the like. Furthermore, different IAB nodes may have different capabilities for simultaneous communication depending on network conditions and/or transmission parameters of the simultaneous communications, such as beam-forming directions associated with the simultaneous communications, transmit powers of the simultaneous communications, whether such simultaneous communications are synchronized, frequencies of cells via which the IAB node can communicate, and/or the like. Some techniques and apparatuses described herein enable an IAB node to signal a capability of the IAB node for simultaneous communication via multiple links, which may be subject to one or more conditions. In this way, an IAB node can reduce latency, improve reliability, improve spectral efficiency, and/or the like by taking advantage of simultaneous communication according to a capability of the IAB node.

As indicated above, FIG. 4 is provided as an example. Other examples may differ from what is described with regard to FIG. 4.

Figure 5:
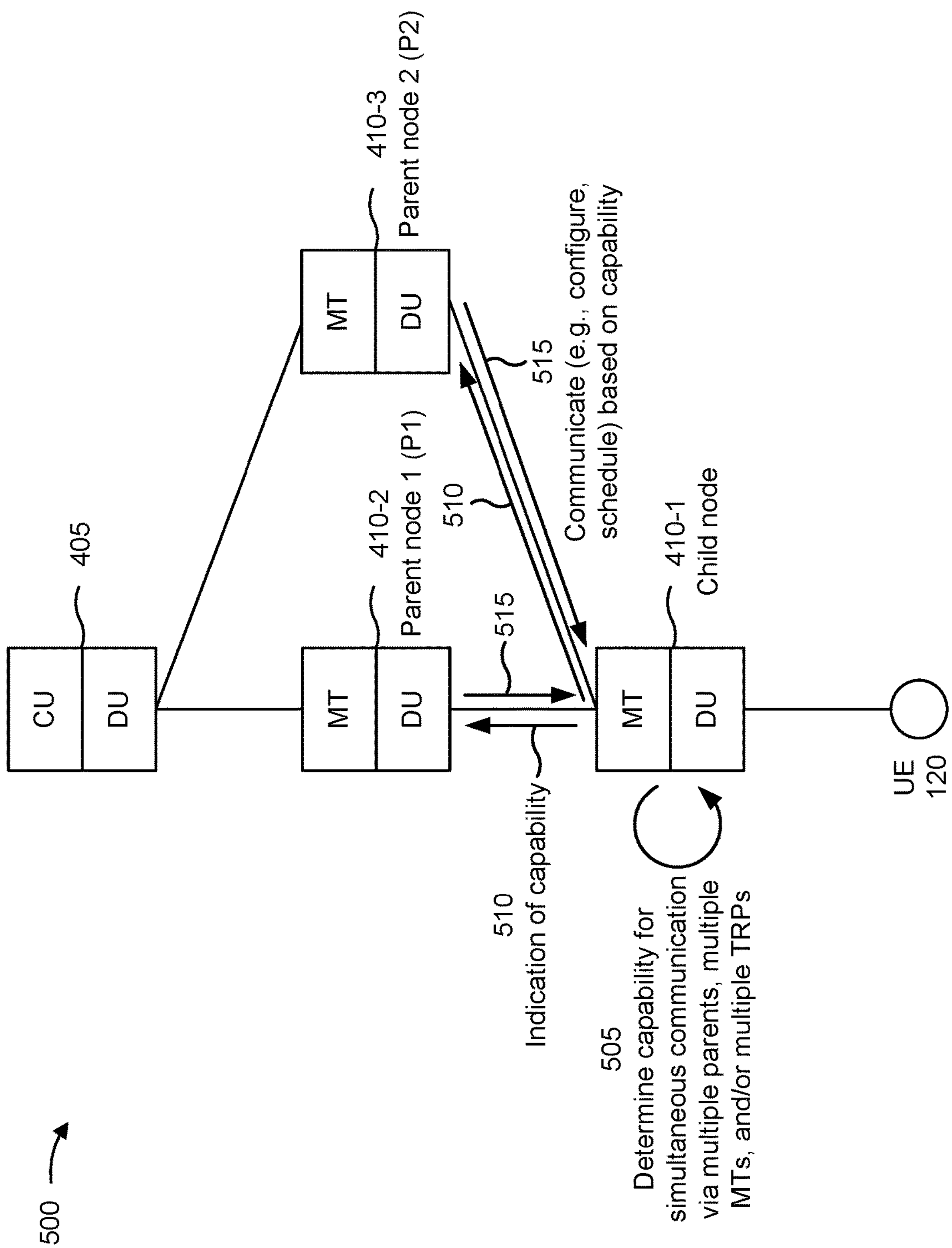
FIGS. 5-9 are diagrams illustrating examples of simultaneous communication capability signaling in an IAB network, in accordance with various aspects of the present disclosure.

FIG. 5 is a diagram illustrating an example 500 of simultaneous communication capability signaling in an IAB network, in accordance with various aspects of the present disclosure. As shown in FIG. 5, an IAB network may include an IAB donor 405 and one or more IAB nodes 410, shown as a first IAB node 410-1 that is a child node of both a second IAB node 410-2 and a third IAB node 410-3. Below, the first IAB node 410-1 will be referred to as a child node, the second IAB node 410-2 will be referred to as a first parent node (shown as Parent node 1 or P1), and the third IAB node 410-3 will be referred to as a second parent node (shown as Parent node 2 or P2). Although the child node is shown as an IAB node, in some aspects, the child node may be a UE 120.

As shown by reference number 505, the child node may determine a capability of the child node for simultaneous communication. The capability may be a capability for simultaneous communication with respect to multiple parent nodes of the child node, multiple MT components of the child node, and/or multiple TRPs of the child node. For example, in some aspects, the capability may include a capability for simultaneous communication with multiple parent nodes of the child node, as described in more detail below in connection with FIG. 6. Additionally, or alternatively, the capability may be a capability for simultaneous communication using multiple MT components of the child node, as described in more detail below in connection with FIG. 7. Additionally, or alternatively, the capability may be a capability for simultaneous communication using multiple TRPs of the child node, as described in more detail below in connection with FIG. 8.

In some aspects, the capability is for simultaneous communication using different or multiple RATs. For example, the child node may indicate a capability for simultaneous communication using a dual connectivity mode that uses two RATs, such as an Evolved Universal Mobile Telecommunications System (UMTS) Terrestrial Radio Access (E-UTRA) New Radio (NR) dual connectivity (EN-DC) mode or an NR E-UTRA dual connectivity (NE-DC) mode. Additionally, or alternatively, the capability may be for simultaneous communication using a single RAT. For example, the capability may be for simultaneous communication using only an NR RAT.

In some aspects, the capability for simultaneous communication may be subject to a condition. In some aspects, the child node may determine and/or identify the condition. Additionally, or alternatively, the child node may determine whether the capability for simultaneous communication is conditional (e.g., subject to a condition) or unconditional (e.g., not subject to a condition). In some aspects, the condition may depend on an architecture and/or hardware configuration of the child node, such as whether the child node supports full duplex communication, a level of self-interference generated by transmissions of the child node, an ability of the child node to mitigate and/or cancel such self-interference, a number of transmit chains and/or or receive chains of the child node, whether such transmit chains and/or receive chains are shared by multiple antennas of the child node, and/or the like. Additionally, or alternatively, the condition may depend on a network condition and/or a transmission parameter associated with simultaneous communication, such as beam-forming directions associated with simultaneous communications, transmit powers of the simultaneous communications, whether such simultaneous communications are synchronized, and/or the like.

In some aspects, the condition may depend on a transmit power associated with one or more simultaneous communications, a receive power associated with one or more simultaneous communications, a transmission timing associated with one or more simultaneous communications, a reception timing associated with one or more simultaneous communications, a resource allocation of one or more simultaneous communications (e.g., a time domain resource allocation, a frequency domain resource allocation, a spatial domain resource allocation, and/or the like), a transmit frequency associated with one or more simultaneous communications, a receive frequency associated with one or more simultaneous communications, a resource block separation between or among multiple simultaneous communications, a frequency separation between or among multiple simultaneous communications, a beam direction associated with one or more simultaneous communications, a channel type (e.g., physical downlink control channel (PDCCH), physical downlink shared channel (PDSCH), physical uplink shared channel (PUSCH), physical uplink control channel (PUCCH), and/or the like) associated with one or more simultaneous communications, an MCS associated with one or more simultaneous communications, a rank (e.g., as indication by a rank indication) associated with one or more simultaneous communications, and/or the like.

As shown by reference number 510, the child node may transmit an indication of the capability (sometimes referred to as a capability indication) of the child node for simultaneous communication. In some aspects, the child node may transmit the indication of the capability to a parent node of the child node or to multiple parent nodes of the child node, as shown in FIG. 5. Additionally, or alternatively, the child node may transmit the indication of the capability to an IAB donor 405 (e.g., a CU of the IAB donor 405), such as via an F1 interface (e.g., an F1 application protocol (F1-AP) interface). In some aspects, a parent node of the child node may transmit or relay an indication of the capability toward or to the IAB donor 405. The child node may transmit the capability indication periodically (e.g., according to a report configuration), semi-statically (e.g., in an RRC message), dynamically (e.g., in uplink control information), based at least in part on a dynamic request (e.g., in downlink control information), based at least in part on detecting a triggering event (e.g., a change to a capability of the child node for simultaneous communication), and/or the like.

In some aspects, the child node may transmit the indication of the capability based at least in part on receiving a report configuration from a control node (e.g., a parent node of the child node, the IAB donor 405, and/or the like). The report configuration may request the capability indication, may indicate one or more resources for transmission of the capability indication, may indicate a periodicity for transmission of the capability indication, may indicate one or more parameters to be included in the capability indication, may indicate a combination of parent nodes, MT components, and/or TRPs for which the capability for simultaneous communication is to be reported, and/or the like. The report configuration may be transmitted semi-statically (e.g., in an RRC message) and/or dynamically (e.g., in downlink control information).

In some aspects, the child node may transmit the indication of the capability for simultaneous communication for all combinations of parent nodes with which the child node is communicating (e.g., for all combinations of parent nodes to which the child node is connected, for which an RRC connection has been established, and/or the like). Similarly, in some aspects, the child node may transmit the indication of the capability for simultaneous communication for all combinations of MT components included in the child node. Similarly, in some aspects, the child node may transmit the indication of the capability for simultaneous communication for all combinations of TRPs included in the child node.

Alternatively, the child node may transmit the indication of the capability for simultaneous communication for a subset of parent nodes with which the child node is communicating, for a subset of MT components included in the child node, and/or for a subset of TRPs included in the child node. In some aspects, the subset (or respective subsets) may be indicated in the report configuration.

In some aspects, the child node may transmit (e.g., with the capability indication) an indication of whether the capability of the child node for simultaneous communication is subject to a condition (e.g., whether the capability is conditional or unconditional). In some aspects, the indication of whether the capability for simultaneous communication is conditional or unconditional is a single bit. A first value of the bit (e.g., 0) may indicate that the capability is not subject to a condition (e.g., is unconditional), and a second value of the bit (e.g., 1) may indicate that the capability is subject to a condition (e.g., is conditional). In some aspects, the indication of whether the capability for simultaneous communication is conditional or unconditional includes an indication of the condition to which simultaneous communication by the child node is subject. Example conditions are described above.

As shown by reference number 515, the child node may communicate with another node in the IAB network based at least in part on the capability of the child node for simultaneous communication. The other node may include, for example, a control node that configures and/or schedules resources for the child node, such as a parent node of the child node (e.g., a DU of the parent node), the IAB donor 405 (e.g., a CU and/or a DU of the IAB donor 405), and/or the like. For example, the control node may transmit a configuration to the child node and/or may schedule resources for the child node (e.g., by transmitting a resource allocation to the child node) based at least in part on the capability. In some aspects, the capability indication may be transmitted to and received by a CU of the IAB donor 405, and the CU may transmit or relay the capability indication to or toward one or more parent nodes of the child node. Additionally, or alternatively, the CU may transmit a configuration and/or a resource allocation to or toward a parent node of the child node, and the parent node may transmit or relay the configuration and/or the resource allocation to or toward the child node.

As an example, if the child node is capable of communicating with multiple parent nodes simultaneously, the control node may schedule resources, for a first parent node, that are also scheduled for a second parent node. Furthermore, the child node may transmit simultaneous communications in scheduled resources. In some aspects, the child node may communicate simultaneously with multiple parent nodes of the child node, using multiple MT components of the child node, and/or using multiple TRPs of the child node based at least in part on the capability, as described in more detail in connection with FIGS. 6-9.

In some aspects, the child node may receive a configuration or a resource allocation based at least in part on the capability indication and may not be capable of supporting the configuration or the resource allocation. For example, simultaneous communication by the child node may be subject to a condition, and the configuration or the resource allocation may violate the condition (e.g., because the child node did not indicate that simultaneous communication is subject to the condition, because the child node did not indicate the condition, or because of an error, among other examples). In this case, the child node may transmit an indication that the child node does not support the configuration or the resource allocation. In some aspects, if the child node does support the configuration or the resource allocation, then the child node may transmit an indication that the child node supports the configuration or the resource allocation. The child node may transmit the indication of whether the child node supports the configuration or the resource allocation to a control node, such as a parent node or an IAB donor 405.

As a more specific example, the child node may receive downlink control information (DCI) that indicates a first set of resources scheduled for the child node (e.g., for communication with a first parent node of the child node, for communication using a first MT component of the child node, and/or for communication using a first TRP of the child node). The child node may determine that the first set of resources conflicts with a second set of resources scheduled for the child node (e.g., for communication with a second parent node of the child node, for communication using a second MT component of the child node, and/or for communication using a second TRP of the child node). For example, the first set of resources and the second set of resources may conflict due to a condition associated with capability for the simultaneous communication. Based at least in part on this determination, the child node may transmit (e.g., in uplink control information (UCI)) an indication that the child node is not capable of communicating using the first set of resources.

By enabling an IAB node to signal a capability of the IAB node for simultaneous communication via multiple links, and thereafter communicate simultaneously using the multiple links, some techniques and apparatuses described herein can reduce latency, improve throughput, improve reliability, improve spectral efficiency, and/or the like by taking advantage of simultaneous communication according to a capability of the IAB node. Furthermore, by using the capability to configure the IAB node and/or schedule resources for the IAB node, configuration errors and/or resource scheduling conflicts can be reduced.

As indicated above, FIG. 5 is provided as an example. Other examples may differ from what is described with regard to FIG. 5.

Figure 6:
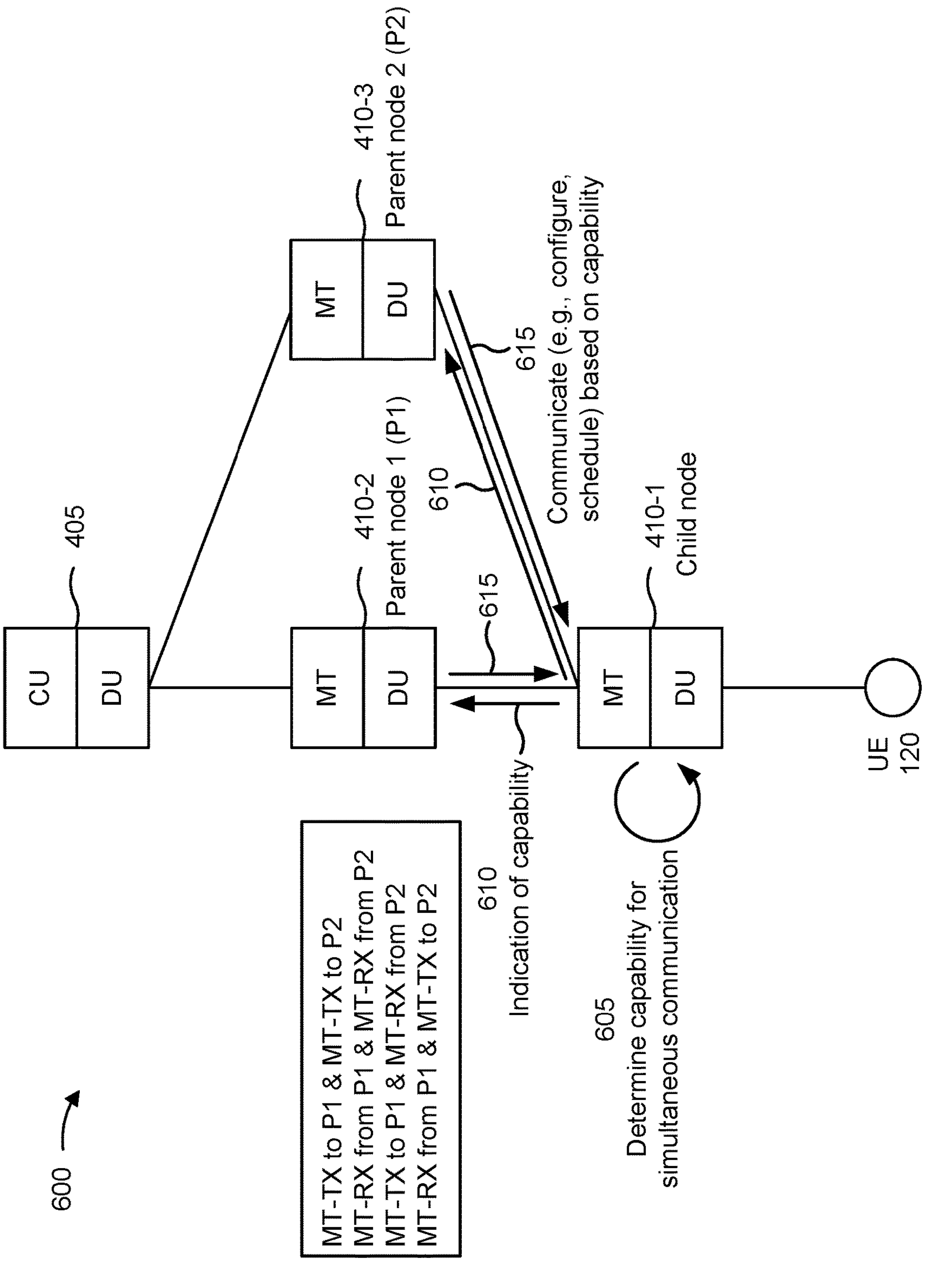

FIG. 6 is a diagram illustrating an example 600 of simultaneous communication capability signaling in an IAB network, in accordance with various aspects of the present disclosure. Example 600 relates to capability signaling for simultaneous communication with multiple parent nodes. As in FIG. 5, an IAB network may include an IAB donor 405 and one or more IAB nodes 410, shown as a first IAB node 410-1 that is a child node of both a second IAB node 410-2 and a third IAB node 410-3. Below, the first IAB node 410-1 will be referred to as a child node, the second IAB node 410-2 will be referred to as a first parent node (shown as Parent node 1 or P1), and the third IAB node 410-3 will be referred to as a second parent node (shown as Parent node 2 or P2). Although the child node is shown as an IAB node, in some aspects, the child node may be a UE 120.

As shown by reference number 605, the child node may determine a capability of the child node for simultaneous communication. In example 600, the capability is a capability for simultaneous communication with respect to multiple parent nodes of the child node. For example, the capability may be a capability for the child node to simultaneously communicate with multiple parent nodes of the child node. As described above in connection with FIG. 5, the capability for simultaneous communication with multiple parent nodes may be for a single RAT, may be for multiple RATs (e.g., a first RAT for a first parent node and a second RAT for a second parent node), and/or may be subject to a condition.

As shown by reference number 610, the child node may transmit an indication of the capability of the child node for simultaneous communication with multiple parent nodes, as described above in connection with FIG. 5. For example, the capability indication may indicate whether the child node supports simultaneous transmission to multiple parents of the child node, such as simultaneous transmission from an MT of the child node to a first parent node as well as from the MT of the child node to a second parent node, shown as MT-TX to P1 & MT-TX to P2. Additionally, or alternatively, the capability indication may indicate whether the child node supports simultaneous reception from multiple parent nodes of the child node, such as simultaneous reception by an MT of the child node from a first parent node as well as by the MT of the child node from a second parent node, shown as MT-RX from P1 & MT-RX from P2. Additionally, or alternatively, the capability indication may indicate whether the child node supports simultaneous transmission to a first parent of the child node and reception from a second parent of the child node, such as simultaneous transmission by an MT of the child node to a first parent node and reception by the MT of the child node from a second parent node (shown as MT-TX to P1 & MT-RX from P2) or simultaneous reception by an MT of the child node from a first parent node and transmission by the MT of the child node to a second parent node (shown as MT-RX from P1 & MT-TX to P2).

In some aspects, the capability indication may be a bitmap, where each bit corresponds to a combination of simultaneous transmission and/or reception for a combination of parent nodes. Alternatively, the capability indication may be an index value, where different index values map to different combinations of simultaneous transmission and/or reception for a combination of parent nodes. In some aspects, the capability indication may identify the parent nodes with which the node is capable of simultaneously communicating (e.g., shown as P1 and P2, but which may include a cell identifier, node identifier, IAB node identifier, base station identifier, and/or the like).

In some aspects, the capability of the child node for simultaneous communication may apply to two parent nodes of the child node, as shown in FIG. 6. Alternatively, the capability of the child node for simultaneous communication may apply to more than two parent nodes of the child node, such as three parent nodes of the child node: P1, P2, and P3 (not shown). In this case, the child node may report simultaneous combination capabilities for multiple pairs of parent nodes, such as for P1 and P2 (described above and shown in FIG. 6), for P1 and P3 (similar to above and FIG. 6, but replacing P2 with P3), and for P2 and P3 (similar to above and FIG. 6, but replacing P1 with P3). Additionally, or alternatively, the child node may indicate a capability for simultaneous communication with more than two parents. For example, the child node may indicate that the child node has a capability to simultaneously transmit to a first parent node using an MT of the child node, transmit to a second parent node using the MT of the child node, and receive from a third parent node using the MT of the child node (e.g., MT-TX to P1 & MT-TX to P2 & MT-RX from P3).

In some aspects, the child node may indicate a capability for simultaneous communication for all combinations of parent nodes (e.g., all combinations of simultaneous transmission and reception capabilities for all combinations of parent nodes). For example, for three parent nodes (P1, P2, and P3), the child node may indicate one or more of the following capabilities: MT-TX to P1 & MT-TX to P2 & MT-TX to P3, MT-TX to P1 & MT-TX to P2 & MT-RX from P3, MT-TX to P1 & MT-RX from P2 & MT-TX to P3, MT-RX from P1 & MT-TX to P2 & MT-TX to P3, MT-TX to P1 & MT-RX from P2 & MT-RX from P3, MT-RX from P1 & MT-RX from P2 & MT-TX to P3, MT-RX from P1 & MT-TX to P2 & MT-RX from P3, and/or MT-RX from P1 & MT-RX from P2 & MT-RX from P3. Alternatively, the child node may indicate a capability for simultaneous communication for a subset of parent nodes of the more than two parent nodes. In some aspects, the subset may be a subset that includes only those combinations of parent nodes with which the child node is capable of simultaneously communicating (and not any combinations of parent nodes with which the child node is not capable of simultaneously communicating). Additionally, or alternatively, the subset may be indicated and/or requested in a report configuration.

As shown by reference number 615, the child node may communicate with another node (e.g., a control node, such as a parent node or a CU) in the IAB network based at least in part on the capability of the child node for simultaneous communication, as described above in connection with FIG. 5. For example, a control node may transmit a configuration to the child node and/or may schedule resources for the child node (e.g., by transmitting a resource allocation to the child node) based at least in part on the capability. As an example, if the child node is capable of communicating with multiple parent nodes simultaneously, the control node may schedule resources (e.g., time resources, frequency resources, or spatial resources, among other examples), for a first parent node, that are also scheduled for a second parent node. Furthermore, the child node may transmit simultaneous communications in scheduled resources. For example, the child node may communicate simultaneously with multiple parent nodes of the child node.

By enabling an IAB node to signal a capability of the IAB node for simultaneous communication with multiple parent nodes, and thereafter communicate simultaneously with the multiple parent nodes, some techniques and apparatuses described herein can reduce latency, improve throughput, improve reliability, improve spectral efficiency, and/or the like by taking advantage of simultaneous communication according to a capability of the IAB node. Furthermore, by using the capability to configure the IAB node and/or schedule resources for the IAB node, configuration errors and/or resource scheduling conflicts can be reduced.

As indicated above, FIG. 6 is provided as an example. Other examples may differ from what is described with regard to FIG. 6.

Figure 7:
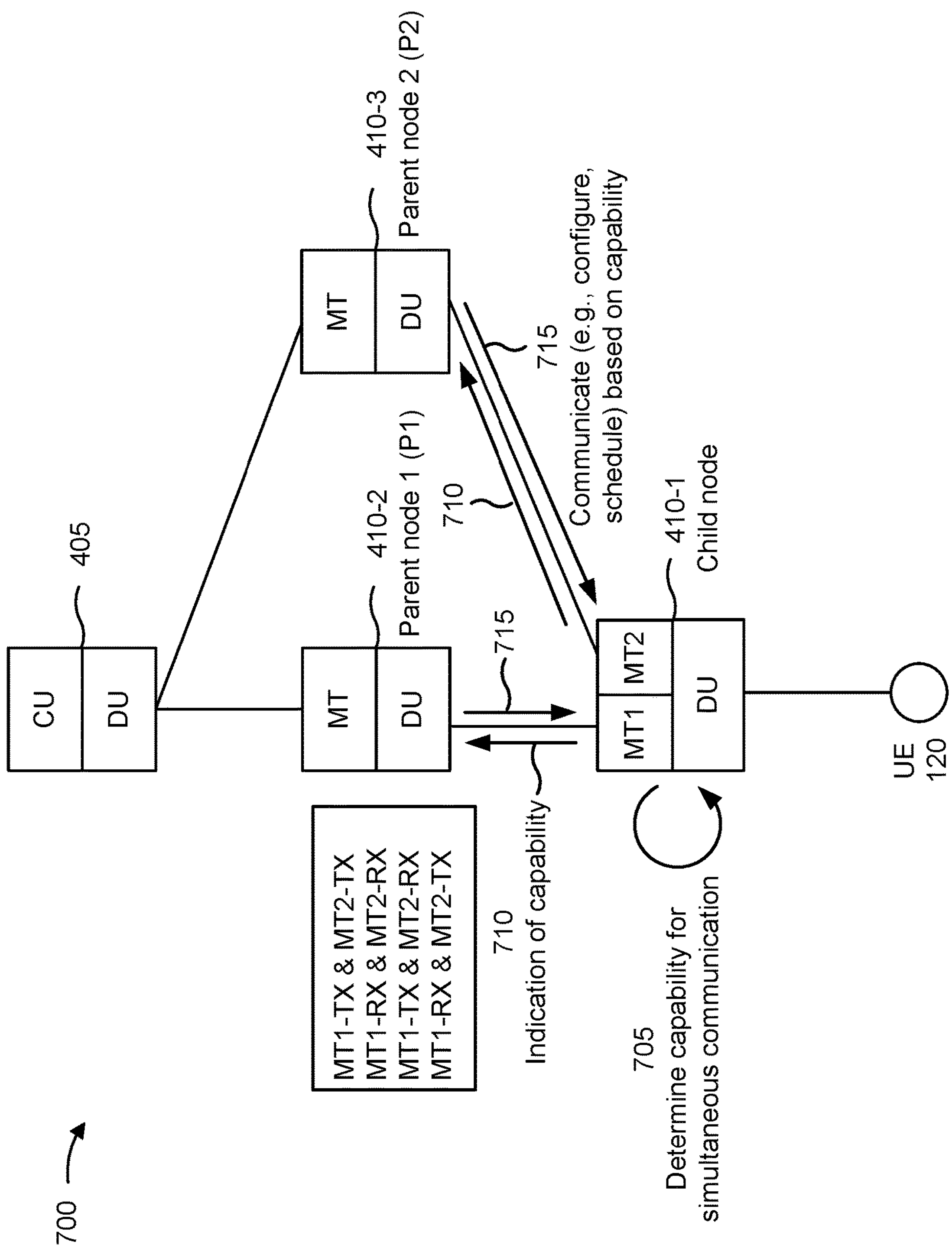

FIG. 7 is a diagram illustrating an example 700 of simultaneous communication capability signaling in an IAB network, in accordance with various aspects of the present disclosure. Example 700 relates to capability signaling for simultaneous communication using multiple MT components of a child node (e.g., multiple MTs or multiple MT functions). As in FIG. 5, an IAB network may include an IAB donor 405 and one or more IAB nodes 410, shown as a first IAB node 410-1 that is a child node of both a second IAB node 410-2 and a third IAB node 410-3. Below, the first IAB node 410-1 will be referred to as a child node, the second IAB node 410-2 will be referred to as a first parent node (shown as Parent node 1 or P1), and the third IAB node 410-3 will be referred to as a second parent node (shown as Parent node 2 or P2). Although the child node is shown as an IAB node, in some aspects, the child node may be a UE 120.

As shown in FIG. 7, the child node may include multiple MT components, shown as a first MT component MT1 and a second MT component MT2. As shown, the first MT component may be used to communicate with the first parent node, and the second MT component may be used to communicate with the second parent node. Thus, different MT components of the child node may communicate with different parent nodes of the child node.

As shown by reference number 705, the child node may determine a capability of the child node for simultaneous communication. In example 700, the capability is a capability for simultaneous communication with respect to multiple MT components of the child node. For example, the capability may be a capability for the child node to simultaneously communicate using multiple MT components of the child node. As described above in connection with FIG. 5, the capability for simultaneous communication using multiple MT components may be for a single RAT, may be for multiple RATs (e.g., a first RAT for a first MT component and a second RAT for a second MT component), and/or may be subject to a condition.

As shown by reference number 710, the child node may transmit an indication of the capability of the child node for simultaneous communication using multiple MT components, as described above in connection with FIG. 5. For example, the capability indication may indicate whether the child node supports simultaneous transmission by multiple MT components of the child node, such as simultaneous transmission by a first MT component of the child node and by a second MT component of the child node, shown as MT1-TX & MT2-TX. Additionally, or alternatively, the capability indication may indicate whether the child node supports simultaneous reception by multiple MT components of the child node, such as simultaneous reception by a first MT component of the child node and by a second MT component of the child node, shown as MT1-RX & MT2-RX. Additionally, or alternatively, the capability indication may indicate whether the child node supports simultaneous transmission by a first MT component of the child node and reception by a second MT component of the child node, such as simultaneous transmission by a first MT component of the child node and reception by a second MT component of the child node (shown as MT1-TX & MT2-RX) or simultaneous reception by a first MT component of the child node and transmission by a second MT component of the child node (shown as MT1-RX & MT2-TX).

In some aspects, the capability indication may be a bitmap, where each bit corresponds to a combination of simultaneous transmission and/or reception for a combination of MT components. Alternatively, the capability indication may be an index value, where different index values map to different combinations of simultaneous transmission and/or reception for a combination of MT components. In some aspects, the capability indication may identify the MT components with which the node is capable of using to simultaneously communicate (e.g., shown as MT1 and MT2, but which may include a cell identifier, node identifier, IAB node identifier, base station identifier, and/or the like).

In some aspects, the capability of the child node for simultaneous communication may apply to two MT components of the child node, as shown in FIG. 7. Alternatively, the capability of the child node for simultaneous communication may apply to more than two MT components of the child node. In this case, the child node may report simultaneous combination capabilities for multiple pairs of MT components, such as for MT1 and MT2 (described above and shown in FIG. 7), for MT1 and MT3 (similar to above and FIG. 7, but replacing MT2 with MT3), and for MT2 and MT3 (similar to above and FIG. 7, but replacing MT1 with MT3). Additionally, or alternatively, the child node may indicate a capability for simultaneous communication using more than two MT components. For example, the child node may indicate that the child node has a capability to simultaneously transmit using a first MT component of the child node, transmit using a second MT component of the child node, and receive using a third MT component of the child node (e.g., MT1-TX & MT2-TX & MT3-RX).

In some aspects, the child node may indicate a capability for simultaneous communication for all combinations of MT components (e.g., all combinations of simultaneous transmission and reception capabilities for all combinations of MT components). For example, for three MT components (MT1, MT2, and MT3), the child node may indicate one or more of the following capabilities: MT1-TX & MT2-TX & MT3-TX, MT1-TX & MT2-TX & MT3-RX, MT1-TX & MT2-RX & MT3-TX, MT1-RX & MT2-TX & MT3-TX, MT1-TX & MT2-RX & MT3-RX, MT1-RX & MT2-RX & MT3-TX, MT1-RX & MT2-TX & MT3-RX, and/or MT1-RX & MT2-RX & MT3-RX. Alternatively, the child node may indicate a capability for simultaneous communication for a subset of MT components of the more than two MT components. In some aspects, the subset may be a subset that includes only those combinations of MT components with which the child node is capable of simultaneously communicating (and not any combinations of MT components with which the child node is not capable of simultaneously communicating). Additionally, or alternatively, the subset may be indicated and/or requested in a report configuration.

As shown by reference number 715, the child node may communicate with another node (e.g., a control node, such as a parent node or a CU) in the IAB network based at least in part on the capability of the child node for simultaneous communication, as described above in connection with FIG. 5. For example, a control node may transmit a configuration to the child node and/or may schedule resources for the child node (e.g., by transmitting a resource allocation to the child node) based at least in part on the capability. As an example, if the child node is capable of communicating using multiple MT components simultaneously, the control node may schedule resources (e.g., time resources, frequency resources, or spatial resources, among other examples), for a first MT component of the child node, that are also scheduled for a second MT component of the child node. Furthermore, the child node may transmit simultaneous communications in scheduled resources. For example, the child node may communicate simultaneously using multiple MT components of the child node.

By enabling an IAB node to signal a capability of the IAB node for simultaneous communication with multiple MT components, and thereafter communicate simultaneously using the multiple MT components, some techniques and apparatuses described herein can reduce latency, improve throughput, improve reliability, improve spectral efficiency, and/or the like by taking advantage of simultaneous communication according to a capability of the IAB node. Furthermore, by using the capability to configure the IAB node and/or schedule resources for the IAB node, configuration errors and/or resource scheduling conflicts can be reduced.

As indicated above, FIG. 7 is provided as an example. Other examples may differ from what is described with regard to FIG. 7.

Figure 8:
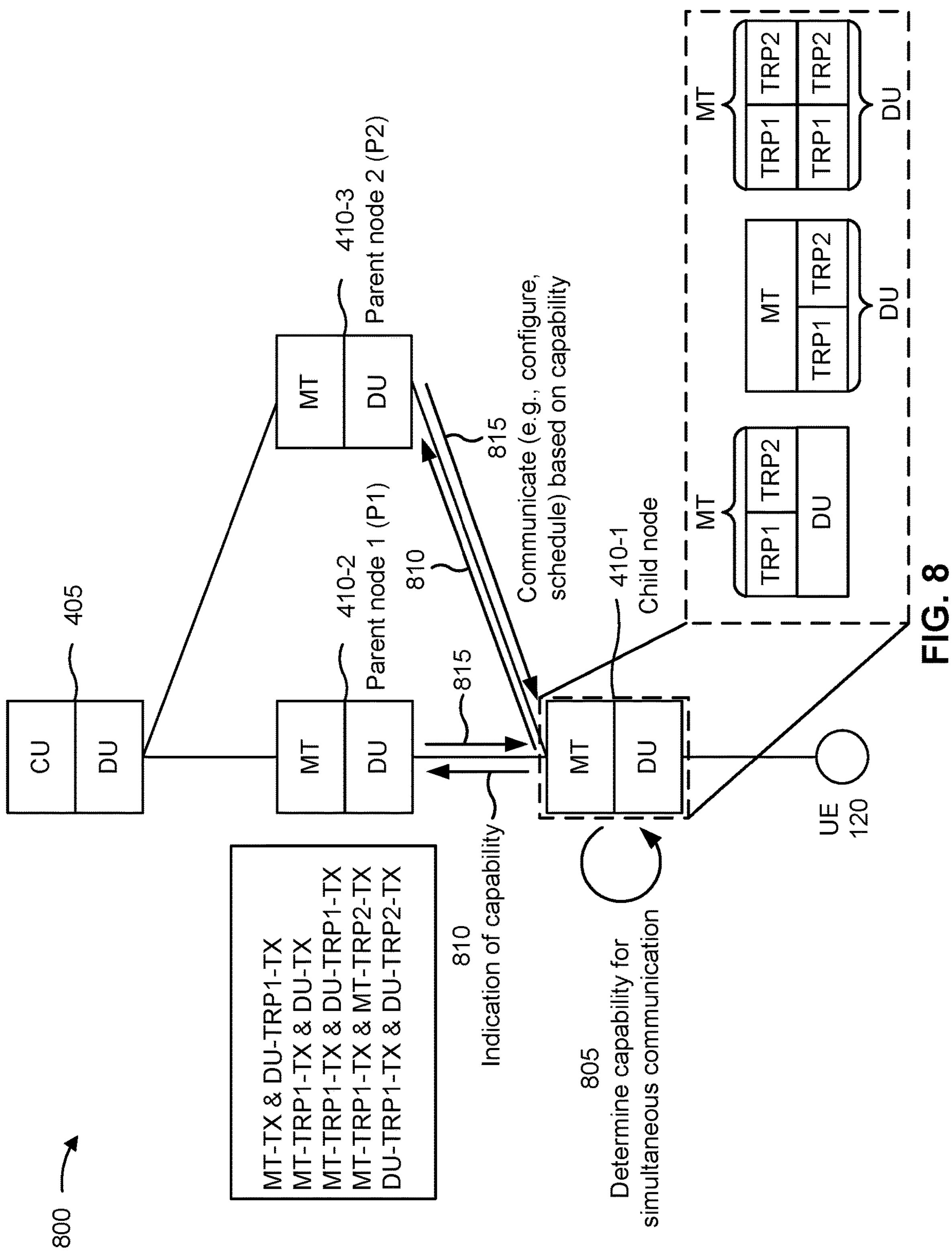

FIG. 8 is a diagram illustrating an example 800 of simultaneous communication capability signaling in an IAB network, in accordance with various aspects of the present disclosure. Example 800 relates to capability signaling for simultaneous communication using multiple TRPs of a child node (or multiple panels of a child node). As in FIG. 5, an IAB network may include an IAB donor 405 and one or more IAB nodes 410, shown as a first IAB node 410-1 that is a child node of both a second IAB node 410-2 and a third IAB node 410-3. Below, the first IAB node 410-1 will be referred to as a child node, the second IAB node 410-2 will be referred to as a first parent node (shown as Parent node 1 or P1), and the third IAB node 410-3 will be referred to as a second parent node (shown as Parent node 2 or P2). Although the child node is shown as an IAB node, in some aspects, the child node may be a UE 120.

As shown in FIG. 8, an MT component of the child node may include multiple TRPs, shown as a first TRP of the MT component (e.g., MT-TRP1) and a second TRP of the MT component (e.g., MT-TRP2). Additionally, or alternatively, a DU component of the child node may include multiple TRPs, shown as a first TRP of the DU component (e.g., DU-TRP1) and a second TRP of the DU component (e.g., DU-TRP2). In some aspects, a first MT-TRP may be used to communicate with the first parent node, and a second MT-TRP may be used to communicate with the second parent node. Thus, different MT-TRPs of the child node may communicate with different parent nodes of the child node. Additionally, or alternatively, a first DU-TRP may be used to communicate with a first child node, and a second DU-TRP may be used to communicate with a second child node. Thus, different DU-TRPs of the child node may communicate with different child nodes of the child node.

As shown by reference number 805, the child node may determine a capability of the child node for simultaneous communication. In example 800, the capability is a capability for simultaneous communication with respect to multiple TRPs of the child node. For example, the capability may be a capability for the child node to simultaneously communicate using multiple TRPs of the child node. As described above in connection with FIG. 5, the capability for simultaneous communication using multiple TRPs may be for a single RAT, may be for multiple RATs (e.g., a first RAT for a first MT component and a second RAT for a second MT component), and/or may be subject to a condition.

As shown by reference number 810, the child node may transmit an indication of the capability of the child node for simultaneous communication using multiple TRPs, as described above in connection with FIG. 5. For example, the capability indication may indicate whether the child node supports simultaneous transmission by multiple TRPs of the child node, such as simultaneous transmission by a first TRP of the child node and by a second TRP of the child node. Additionally, or alternatively, the capability indication may indicate whether the child node supports simultaneous reception by multiple TRPs of the child node, such as simultaneous reception by a first TRP of the child node and by a second TRP of the child node. Additionally, or alternatively, the capability indication may indicate whether the child node supports simultaneous transmission by a first TRP of the child node and reception by a second TRP of the child node, such as simultaneous transmission by a first TRP of the child node and reception by a second TRP of the child node or simultaneous reception by a first TRP of the child node and transmission by a second TRP of the child node.

Additionally, or alternatively, the capability indication may indicate whether the child node supports simultaneous communication by an MT component of the child node and a TRP of a DU of the child node, shown as MT-TX & DU-TRP1-TX (e.g., for simultaneous transmission). Additionally, or alternatively, the capability indication may indicate whether the child node supports simultaneous communication by a DU of the child node and a TRP of an MT component of the child node, shown as MT-TRP1-TX & DU-TX (e.g., for simultaneous transmission). Additionally, or alternatively, the capability indication may indicate whether the child node supports simultaneous communication by a TRP of a DU of the child node and a TRP of an MT component of the child node, shown as MT-TRP1-TX & DU-TRP1-TX (e.g., for simultaneous transmission). Additionally, or alternatively, the capability indication may indicate whether the child node supports simultaneous communication by a first TRP of an MT component of the child node and a second TRP of the MT component of the child node, shown as MT-TRP1-TX & MT-TRP2-TX (e.g., for simultaneous transmission). Additionally, or alternatively, the capability indication may indicate whether the child node supports simultaneous communication by a first TRP of a DU of the child node and a second TRP of the DU of the child node, shown as DU-TRP1-TX & DU-TRP2-TX (e.g., for simultaneous transmission). Although these examples show indications of support for simultaneous transmission, the child node may indicate support for simultaneous reception, or for simultaneous transmission and reception, in a similar manner.

In some aspects, the capability indication may be a bitmap, where each bit corresponds to a combination of simultaneous transmission and/or reception for a combination of TRPs. Alternatively, the capability indication may be an index value, where different index values map to different combinations of simultaneous transmission and/or reception for a combination of TRPs. In some aspects, the capability indication may identify the TRPs with which the node is capable of using to simultaneously communicate (e.g., shown as MT-TRP1, MT-TRP2, DU-TRP1, and DU-TRP2, but which may include a cell identifier, node identifier, IAB node identifier, base station identifier, TRP identifier, and/or the like).

In some aspects, the capability of the child node for simultaneous communication may apply to two TRPs of the child node (e.g., per MT or per DU), as shown in FIG. 8. Alternatively, the capability of the child node for simultaneous communication may apply to more than two TRPs of the child node (e.g., per MT or per DU). In this case, the child node may report simultaneous combination capabilities for multiple pairs of TRPs, such as for MT-TRP1 and MT-TRP2, for MT-TRP1 and MT-TRP3, and for MT-TRP2 and MT-TRP3. Additionally, or alternatively, the child node may indicate a capability for simultaneous communication using more than two TRPs. For example, the child node may indicate that the child node has a capability to simultaneously transmit using a first TRP of the child node, transmit using a second TRP of the child node, and receive using a third TRP of the child node (e.g., MT-TRP1-TX & MT-TRP2-TX & MT-TRP3-RX).

In some aspects, the child node may indicate a capability for simultaneous communication for all combinations of TRPs (e.g., all combinations of simultaneous transmission and reception capabilities for all combinations of TRPs). For example, for three TRPs of an MT component (MT-TRP1, MT-TRP2, and MT-TRP3), the child node may indicate one or more of the following capabilities: MT-TRP1-TX & MT-TRP2-TX & MT-TRP3-TX, MT-TRP1-TX & MT-TRP2-TX & MT-TRP3-RX, MT-TRP1-TX & MT-TRP2-RX & MT-TRP3-TX, MT-TRP1-RX & MT-TRP2-TX & MT-TRP3-TX, MT-TRP1-TX & MT-TRP2-RX & MT-TRP3-RX, MT-TRP1-RX & MT-TRP2-RX & MT-TRP3-TX, MT-TRP1-RX & MT-TRP2-TX & MT-TRP3-RX, and/or MT-TRP1-RX & MT-TRP2-RX & MT-TRP3-RX. Alternatively, the child node may indicate a capability for simultaneous communication for a subset of TRPs of the more than two TRPs. In some aspects, the subset may be a subset that includes only those combinations of TRPs with which the child node is capable of simultaneously communicating (and not any combinations of TRPs with which the child node is not capable of simultaneously communicating). Additionally, or alternatively, the subset may be indicated and/or requested in a report configuration.

As shown by reference number 815, the child node may communicate with another node (e.g., a control node, such as a parent node or a CU) in the IAB network based at least in part on the capability of the child node for simultaneous communication, as described above in connection with FIG. 5. For example, a control node may transmit a configuration to the child node and/or may schedule resources for the child node (e.g., by transmitting a resource allocation to the child node) based at least in part on the capability. As an example, if the child node is capable of communicating using multiple TRPs simultaneously, the control node may schedule resources (e.g., time resources, frequency resources, or spatial resources, among other examples), for a first TRP of the child node, that are also scheduled for a second TRP of the child node. Furthermore, the child node may transmit simultaneous communications in scheduled resources. For example, the child node may communicate simultaneously using multiple TRPs of the child node.

By enabling an IAB node to signal a capability of the IAB node for simultaneous communication with multiple TRPs, and thereafter communicate simultaneously using the multiple TRPs, some techniques and apparatuses described herein can reduce latency, improve throughput, improve reliability, improve spectral efficiency, and/or the like by taking advantage of simultaneous communication according to a capability of the IAB node. Furthermore, by using the capability to configure the IAB node and/or schedule resources for the IAB node, configuration errors and/or resource scheduling conflicts can be reduced.

As described above in connection with FIG. 5, in some aspects, the child node may indicate a capability for simultaneous communication with multiple parent nodes of the child node, using multiple MT components of the child node, and/or using multiple TRPs of the child node. Thus, two or more techniques described in FIGS. 6, 7, and 8 may be combined to indicate a combination of capabilities, such as a capability for simultaneous communication with multiple parents and using multiple MT components, a capability for simultaneous communication with multiple parents and using multiple TRPs, a capability for simultaneous communication using multiple MT components and using multiple TRPs (e.g., where each MT component may include one or more TRPs), or a capability for simultaneous communication with multiple parents, using multiple MT components, and using multiple TRPs.

As indicated above, FIG. 8 is provided as an example. Other examples may differ from what is described with regard to FIG. 8.

Figure 9:
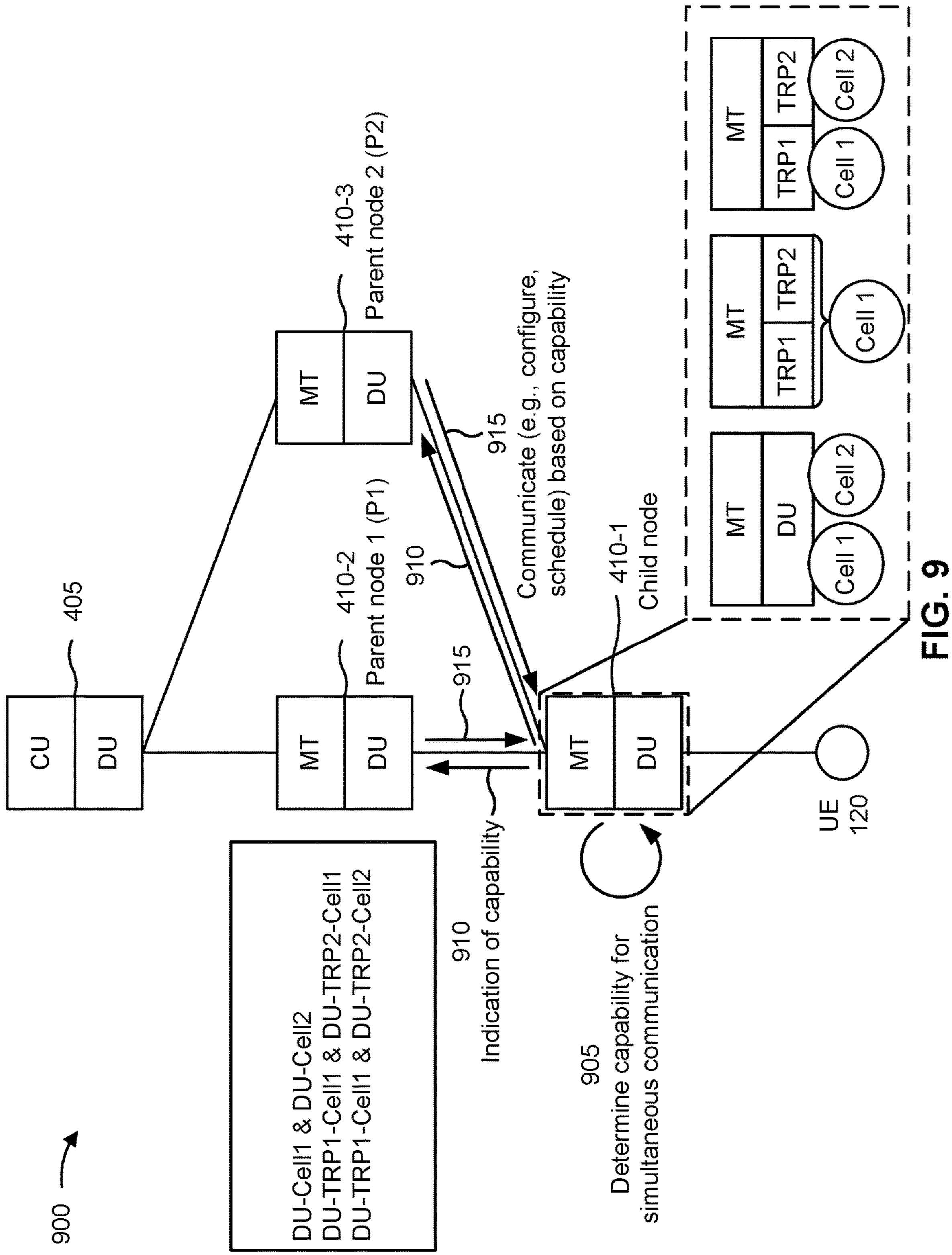

FIG. 9 is a diagram illustrating an example 900 of simultaneous communication capability signaling in an IAB network, in accordance with various aspects of the present disclosure. Example 900 relates to capability signaling for simultaneous communication using multiple cells of a child node, multiple TRPs of a child node (or multiple panels of a child node), and/or the like. As in FIG. 5, an IAB network may include an IAB donor 405 and one or more IAB nodes 410, shown as a first IAB node 410-1 that is a child node of both a second IAB node 410-2 and a third IAB node 410-3. Below, the first IAB node 410-1 will be referred to as a child node, the second IAB node 410-2 will be referred to as a first parent node (shown as Parent node 1 or P1), and the third IAB node 410-3 will be referred to as a second parent node (shown as Parent node 2 or P2). Although the child node is shown as an IAB node, in some aspects, the child node may be a UE 120.

As shown in FIG. 9, a DU component of the child node may be capable of communicating using multiple cells, shown as a first cell (e.g., Cell 1 or DU-Cell1) and a second cell (e.g., Cell2 or DU-Cell2). In some aspects, the first cell may be used to communicate with a first child node, and a second cell may be used to communicate with a second child node. Alternatively, the first cell and the second cell may both be used to communicate with a single child node (e.g., using different component carriers). Thus, different cells of the child node may communicate with different child nodes of the child node or the same child node of the child node.

Additionally, or alternatively, a DU component of the child node may include multiple TRPs, shown as a first TRP of the DU component (e.g., first DU-TRP, TRP1, or DU-TRP1) and a second TRP of the DU component (e.g., second DU-TRP, TRP2, or DU-TRP2). In some aspects, the first DU-TRP may be used to communicate with a first child node, and the second DU-TRP may be used to communicate with a second child node. Alternatively, the first DU-TRP and the second DU-TRP may both be used to communicate with a single child node (e.g., using multiple MIMO layers). Thus, different DU-TRPs of the child node may communicate with different child nodes of the child node or the same child node of the child node.

As shown by reference number 905, the child node may determine a capability of the child node for simultaneous communication. In example 900, the capability is a capability for simultaneous communication with respect to multiple cells and/or multiple TRPs of the child node. For example, the capability may be a capability of the child node to simultaneously communicate using multiple cells and a single DU of the child node, a capability of the child node to simultaneously communicate using a single cell and multiple TRPs of the child node, a capability of the child node to simultaneously communicate using multiple cells and multiple TRPs of the child node (e.g., with one TRP per cell, as shown), and/or the like. The capability for simultaneous communication using multiple cells and/or multiple TRPs may be for a single RAT, may be for multiple RATs (e.g., a first RAT for a first cell and/or a first TRP, a second RAT for a second cell and/or a second TRP, and so on), and/or may be subject to a condition, as described elsewhere herein.

As shown by reference number 910, the child node may transmit an indication of the capability of the child node for simultaneous communication using multiple cells and/or multiple TRPs, as described above in connection with FIG. 5. For example, the capability indication may indicate whether the child node supports simultaneous communication using multiple cells of the child node DU, shown as DU-Cell1 & DU-Cell2. Additionally, or alternatively, the capability indication may indicate whether the child node supports simultaneous communication using multiple TRPs for a single cell of the child node DU, shown as DU-TRP1-Cell1 & DU-TRP2-Cell1. Additionally, or alternatively, the capability indication may indicate whether the child node supports simultaneous communication using multiple TRPs for multiple cells of the child node DU, shown as DU-TRP1-Cell1 & DU-TRP2-Cell2.

In the example described in connection with reference number 910, the capability indication for simultaneous communication is for both simultaneous transmission and simultaneous reception. In some aspects, the child node may specifically indicate whether the capability indication is for simultaneous transmission, simultaneous reception, or both. For example, the capability indication may indicate whether the child node supports simultaneous transmission using multiple cells of the child node DU (e.g., DU-Cell1-TX & DU-Cell2-TX), may indicate whether the child node supports simultaneous reception using multiple cells of the child node DU (e.g., DU-Cell1-RX & DU-Cell2-RX), or may indicate whether the child node supports simultaneous transmission and simultaneous reception using multiple cells of the child node DU (e.g., DU-Cell1 & DU-Cell2, as shown). Additionally, or alternatively, the capability indication may indicate whether the child node supports simultaneous transmission using multiple TRPs for a single cell of the child node DU (e.g., DU-TRP1-Cell1-TX & DU-TRP2-Cell1-TX), may indicate whether the child node supports simultaneous reception using multiple TRPs for a single cell of the child node DU (e.g., DU-TRP1-Cell1-RX & DU-TRP2-Cell1-RX), or may indicate whether the child node supports simultaneous transmission and simultaneous reception using multiple TRPs for a single cell of the child node DU (e.g., DU-TRP1-Cell1 & DU-TRP2-Cell1, as shown). Additionally, or alternatively, the capability indication may indicate whether the child node supports simultaneous transmission using multiple TRPs for multiple cells of the child node DU (e.g., DU-TRP1-Cell1-TX & DU-TRP2-Cell2-TX), whether the child node supports simultaneous reception using multiple TRPs for multiple cells of the child node DU (e.g., DU-TRP1-Cell1-RX & DU-TRP2-Cell2-RX), or whether the child node supports simultaneous communication using multiple TRPs for multiple cells of the child node DU (e.g., DU-TRP1-Cell1 & DU-TRP2-Cell2, as shown).

In some aspects, a control node may use a default capability (e.g., a capability that is not signaled) of the child node for configuration of the child node, scheduling of the child node, and/or the like. The default capability may be that the child node supports simultaneous transmission and simultaneous reception on different cells. For example, the default capability may be that the child node supports simultaneous transmission on a first cell and a second cell, and that the child node supports simultaneous reception on a first cell and a second cell. In some aspects, the control node may use the default capability unless the child node explicitly provides a capability indication that indicates a capability of the child node that is different from the default capability.

In some aspects, the child node may report only pairs or sets of cells for which simultaneous communication is not supported, and the control node may use the default capability for other pairs or sets of cells. For example, for a child node that supports three cells, the child node may indicate that the child node is not capable of simultaneous communication using a first cell and a second cell. In this case, the control node may determine that the child node is capable of simultaneous communication using the first cell and a third cell, and control may also be capable of simultaneous communication using the second cell and the third cell. In some aspects, the child node may indicate a condition associated with the simultaneous communication, such as a TDM requirement or condition, indicating that a set or pair of cells and/or a set or pair of TRPs cannot operate at the same time.

In some aspects, the capability indication may be a bitmap, where each bit corresponds to a combination of simultaneous transmission and/or reception for a combination of cells and/or TRPs. Alternatively, the capability indication may be an index value, where different index values map to different combinations of simultaneous transmission and/or reception for a combination of cells and/or TRPs. In some aspects, the capability indication may identify the cells that the node is capable of using to simultaneously communicate.

In some aspects, the capability of the child node for simultaneous communication may apply to two cells of the child node, as shown in FIG. 9. Alternatively, the capability of the child node for simultaneous communication may apply to more than two cells of the child node. In this case, the child node may report simultaneous combination capabilities for multiple pairs of cells. Additionally, or alternatively, the child node may indicate a capability for simultaneous communication using more than two cells. For example, the child node may indicate that the child node has a capability to simultaneously transmit using a first cell of the child node, transmit using a second cell of the child node, and receive using a third cell of the child node.

In some aspects, the child node may indicate a capability for simultaneous communication for all combinations of cells (e.g., all combinations of simultaneous transmission and reception capabilities for all combinations of cells). Alternatively, the child node may indicate a capability for simultaneous communication for a subset of cells of the more than two cells. In some aspects, the subset may be a subset that includes only those combinations of cells with which the child node is capable of simultaneously communicating (and not any combinations of TRPs with which the child node is not capable of simultaneously communicating). Alternatively, the subset may be a subset that includes only those combinations of cells with which the child node is not capable of simultaneously communicating (and not any combinations of TRPs with which the child node is capable of simultaneously communicating). Additionally, or alternatively, the subset may be indicated and/or requested in a report configuration.

As shown by reference number 915, the child node may communicate with another node (e.g., a control node, such as a parent node or a CU) in the IAB network based at least in part on the capability of the child node for simultaneous communication, as described above in connection with FIG. 5. For example, a control node may transmit a configuration to the child node and/or may schedule resources for the child node (e.g., by transmitting a resource allocation to the child node) based at least in part on the capability. As an example, if the child node is capable of communicating using multiple cells simultaneously, the control node may schedule resources (e.g., time resources, frequency resources, or spatial resources, among other examples), for a first cell of the child node, that are also scheduled for a second cell of the child node. Furthermore, the child node may transmit simultaneous communications in scheduled resources. For example, the child node may communicate simultaneously using multiple cells of the child node (e.g., may communicate with one or more child nodes of the child node).

By enabling an IAB node to signal a capability of the IAB node for simultaneous communication with multiple cells, and thereafter communicate simultaneously using the multiple cells, some techniques and apparatuses described herein can reduce latency, improve throughput, improve reliability, improve spectral efficiency, and/or the like by taking advantage of simultaneous communication according to a capability of the IAB node. Furthermore, by using the capability to configure the IAB node and/or schedule resources for the IAB node, configuration errors and/or resource scheduling conflicts can be reduced.

In some aspects, the child node may indicate a capability for simultaneous communication with multiple parent nodes of the child node, with multiple child nodes of the child node, using multiple MT components of the child node, using multiple TRPs of the child node, and/or using multiple cells of the child node. Thus, two or more techniques described in FIGS. 6, 7, 8, and 9 may be combined to indicate a combination of capabilities, such as a capability for simultaneous communication with multiple parents and using multiple MT components, a capability for simultaneous communication with multiple parents and/or children and using multiple TRPs, a capability for simultaneous communication using multiple MT components and using multiple TRPs (e.g., where each MT component may include one or more TRPs), a capability for simultaneous communication using multiple cells and using multiple TRPs, or a capability for simultaneous communication with multiple parents, using multiple MT components, and using multiple TRPs, among other examples.

As indicated above, FIG. 9 is provided as an example. Other examples may differ from what is described with regard to FIG. 9.

FIG. 10 is a diagram illustrating an example process 1000 performed, for example, by a node in a wireless network (e.g., a wireless multi-hop network, an IAB network, and/or the like), in accordance with various aspects of the present disclosure. Example process 1000 is an example where the node (e.g., IAB node 410, UE 120, a child node, and/or the like) performs operations associated with simultaneous communication capability signaling in an IAB network.

As shown in FIG. 10, in some aspects, process 1000 may include transmitting an indication of a capability of the node for simultaneous communication with respect to at least one of: multiple parent nodes of the node, multiple mobile termination components of the node, multiple transmit receive points of the node, multiple cells of the node, or a combination thereof (block 1010). For example, the node (e.g., using transmit processor 220, transmit processor 264, controller/processor 240, controller/processor 280, memory 242, memory 282, and/or the like) may transmit an indication of a capability of the node for simultaneous communication with respect to at least one of: multiple parent nodes of the node, multiple mobile termination components of the node, multiple transmit receive points of the node, multiple cells of the node, or a combination thereof, as described above.

As further shown in FIG. 10, in some aspects, process 1000 may include communicating with another node in the wireless network based at least in part on the capability (block 1020). For example, the node (e.g., using transmit processor 220, transmit processor 264, receive processor 238, receive processor 258, controller/processor 240, controller/processor 280, memory 242, memory 282, and/or the like) may communicate with another node in the wireless network based at least in part on the capability, as described above.

Process 1000 may include additional aspects, such as any single aspect or any combination of aspects described below and/or in connection with one or more other processes described elsewhere herein.

In a first aspect, the capability is for simultaneous communication using a single radio access technology.

In a second aspect, alone or in combination with the first aspect, the capability is for simultaneous communication using multiple radio access technologies.

In a third aspect, alone or in combination with one or more of the first and second aspects, communicating with another node in the wireless network based at least in part on the capability comprises receiving at least one of a configuration or a resource allocation based at least in part on the capability.

In a fourth aspect, alone or in combination with one or more of the first through third aspects, the configuration or the resource allocation is received from a parent node of the node or from a central unit in the wireless network.

In a fifth aspect, alone or in combination with one or more of the first through fourth aspects, the indication of the capability of the node for simultaneous communication is transmitted to a parent node of the node or to a central unit in the wireless network.

In a sixth aspect, alone or in combination with one or more of the first through fifth aspects, the indication of the capability indicates at least one of: whether the node supports simultaneous transmission to multiple parent nodes of the node, whether the node supports simultaneous reception from multiple parent nodes of the node, whether the node supports simultaneous transmission to a first parent node of the node and reception from a second parent of the node, or a combination thereof.

In a seventh aspect, alone or in combination with one or more of the first through sixth aspects, the capability of the node for simultaneous communication with respect to multiple parent nodes of the node is a capability of the node for simultaneous communication with two parent nodes of the node.

In an eighth aspect, alone or in combination with one or more of the first through seventh aspects, the capability of the node for simultaneous communication with respect to multiple parent nodes of the node is a capability of the node for simultaneous communication with more than two parent nodes of the node.

In a ninth aspect, alone or in combination with one or more of the first through eighth aspects, the indication of the capability is for a subset of parent nodes of the more than two parent nodes.

In a tenth aspect, alone or in combination with one or more of the first through ninth aspects, the indication of the capability for simultaneous communication identifies the multiple parent nodes with which the node is capable of simultaneous communication.

In an eleventh aspect, alone or in combination with one or more of the first through tenth aspects, the indication of the capability indicates at least one of: whether the node supports simultaneous transmission by multiple mobile termination components of the node, whether the node supports simultaneous reception by multiple mobile termination components of the node, whether the node supports simultaneous transmission by a first mobile termination component of the node and reception by a second mobile termination component of the node, or a combination thereof.

In a twelfth aspect, alone or in combination with one or more of the first through eleventh aspects, the capability of the node for simultaneous communication with respect to multiple mobile termination components of the node is a capability of the node for simultaneous communication using two mobile termination components of the node.

In a thirteenth aspect, alone or in combination with one or more of the first through twelfth aspects, the capability of the node for simultaneous communication with respect to multiple mobile termination components of the node is a capability of the node for simultaneous communication using more than two mobile termination components of the node.

In a fourteenth aspect, alone or in combination with one or more of the first through thirteenth aspects, the indication of the capability is for a subset of mobile termination components of the more than two mobile termination components.

In a fifteenth aspect, alone or in combination with one or more of the first through fourteenth aspects, the indication of the capability for simultaneous communication identifies the multiple mobile termination components that the node is capable of using for simultaneous communication.

In a sixteenth aspect, alone or in combination with one or more of the first through fifteenth aspects, the indication of the capability indicates at least one of: whether the node supports simultaneous transmission by multiple transmit receive points of the node, whether the node supports simultaneous reception by multiple transmit receive points of the node, whether the node supports simultaneous transmission by a first transmit receive point of the node and reception by a second transmit receive point of the node, or a combination thereof.

In a seventeenth aspect, alone or in combination with one or more of the first through sixteenth aspects, the indication of the capability indicates at least one of: whether the node supports simultaneous communication by a mobile termination component of the node and a transmit receive point of a distributed unit of the node, whether the node supports simultaneous communication by a distributed unit of the node and a transmit receive point of a mobile termination component of the node, whether the node supports simultaneous communication by a transmit receive point of a distributed unit of the node and a transmit receive point of a mobile termination component of the node, whether the node supports simultaneous communication by a first transmit receive point of a mobile termination component of the node and a second transmit receive point of the mobile termination component of the node, whether the node supports simultaneous communication by a first transmit receive point of a distributed unit of the node and a second transmit receive point of the distributed unit of the node, or a combination thereof.

In an eighteenth aspect, alone or in combination with one or more of the first through seventeenth aspects, the multiple transmit receive points of the node include at least one of: multiple transmit receive points of a mobile termination component of the node, multiple transmit receive points of a distributed unit component of the node, a first transmit receive point of a mobile termination component of the node and a second transit receive point of a distributed unit component of the node, or a combination thereof.

In a nineteenth aspect, alone or in combination with one or more of the first through eighteenth aspects, the capability of the node for simultaneous communication with respect to multiple transmit receive points of the node is a capability of the node for simultaneous communication using two transmit receive points of the node.

In a twentieth aspect, alone or in combination with one or more of the first through nineteenth aspects, the capability of the node for simultaneous communication with respect to multiple transmit receive points of the node is a capability of the node for simultaneous communication using more than two transmit receive points of the node.

In a twenty-first aspect, alone or in combination with one or more of the first through twentieth aspects, the indication of the capability is for a subset of transmit receive points of the more than two transmit receive points.

In a twenty-second aspect, alone or in combination with one or more of the first through twenty-first aspects, the indication of the capability for simultaneous communication identifies the transmit receive points that the node is capable of using for simultaneous communication.

In a twenty-third aspect, alone or in combination with one or more of the first through twenty-second aspects, the indication of the capability of the node for simultaneous communication is for at least one of: all combinations of parent nodes of the node, all combinations of mobile termination components of the node, all combinations of transmit receive points of the node, all combinations of cells of the node, or a combination thereof.

In a twenty-fourth aspect, alone or in combination with one or more of the first through twenty-third aspects, the indication of the capability of the node for simultaneous communication is transmitted based at least in part on a report configuration received by the node.

In a twenty-fifth aspect, alone or in combination with one or more of the first through twenty-fourth aspects, the report configuration is received from a parent node of the node or from a central unit in the wireless network.

In a twenty-sixth aspect, alone or in combination with one or more of the first through twenty-fifth aspects, the report configuration indicates at least one of: a combination of parent nodes of the node for which the capability of the node for simultaneous communication is to be reported, a combination of mobile termination components of the node for which the capability of the node for simultaneous communication is to be reported, a combination of transmit receive points of the node for which the capability of the node for simultaneous communication is to be reported, or a combination thereof.

In a twenty-seventh aspect, alone or in combination with one or more of the first through twenty-sixth aspects, the indication of the capability of the node for simultaneous communication is transmitted periodically, is transmitted according to a report configuration, is transmitted based at least in part on a dynamic request, or is transmitted based at least in part on detecting a triggering event.

In a twenty-eighth aspect, alone or in combination with one or more of the first through twenty-seventh aspects, the capability of the node for simultaneous communication is subject to a condition.

In a twenty-ninth aspect, alone or in combination with one or more of the first through twenty-eighth aspects, the indication of the capability of the node for simultaneous communication includes an indication of whether the capability is conditional or unconditional.

In a thirtieth aspect, alone or in combination with one or more of the first through twenty-ninth aspects, the indication of whether the capability is conditional or unconditional is a single bit.

In a thirty-first aspect, alone or in combination with one or more of the first through thirtieth aspects, the indication of whether the capability is conditional or unconditional includes an indication of a condition to which the simultaneous communication is subject.

In a thirty-second aspect, alone or in combination with one or more of the first through thirty-first aspects, process 1000 includes receiving a configuration or a resource allocation based at least in part on the indication of the capability; and transmitting an indication of whether the node supports the configuration or the resource allocation based at least in part on a condition associated with the simultaneous communication.

In a thirty-third aspect, alone or in combination with one or more of the first through thirty-second aspects, process 1000 includes receiving downlink control information that indicates a first set of resources scheduled for the node for communication with a first parent node of the node; determining that the first set of resources conflicts with a second set of resources scheduled for the node for communication with a second parent node of the node due to a condition associated with capability for the simultaneous communication; and transmitting, in uplink control information, an indication that the node is not capable of communicating using the first set of resources based at least in part on the determination.

In a thirty-fourth aspect, alone or in combination with one or more of the first through thirty-third aspects, the node is a user equipment or an integrated access and backhaul node.

In a thirty-fifth aspect, alone or in combination with one or more of the first through thirty-fourth aspects, the indication of the capability indicates at least one of: whether the node supports simultaneous transmission via multiple cells of the node, whether the node supports simultaneous reception via multiple cells of the node, whether the node supports simultaneous transmission by a first cell of the node and reception by a second cell of the node, or a combination thereof.

In a thirty-sixth aspect, alone or in combination with one or more of the first through thirty-fifth aspects, the cells of the node include at least one of: multiple cells of a distributed unit component of the node, multiple cells corresponding to multiple transmit receive points of a distributed unit component of the node, or a combination thereof.

In a thirty-seventh aspect, alone or in combination with one or more of the first through thirty-sixth aspects, the capability of the node for simultaneous communication with respect to multiple cells of the node is a capability of the node for simultaneous communication using two cells of the node.

In a thirty-eighth aspect, alone or in combination with one or more of the first through thirty-seventh aspects, the capability of the node for simultaneous communication with respect to multiple cells of the node is a capability of the node for simultaneous communication using more than two cells of the node.

In a thirty-ninth aspect, alone or in combination with one or more of the first through thirty-eighth aspects, the indication of the capability is for a subset of cells of the more than two cells.

In a fortieth aspect, alone or in combination with one or more of the first through thirty-ninth aspects, the indication of the capability for simultaneous communication identifies the cells that the node is capable of using for simultaneous communication.

In a forty-first aspect, alone or in combination with one or more of the first through fortieth aspects, the indication of the capability for simultaneous communication identifies the cells that the node is not capable of using for simultaneous communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a control node in a wireless network (e.g., a wireless multi-hop network, an IAB network, and/or the like), in accordance with various aspects of the present disclosure. Example process 1100 is an example where the control node (e.g., IAB node 410, IAB donor 405, a parent node, a CU, and/or the like) performs operations associated with simultaneous communication capability signaling in an IAB network.

As shown in FIG. 11, in some aspects, process 1100 may include receiving an indication of a capability of a node in the wireless network for simultaneous communication with respect to at least one of: multiple parent nodes of the node, multiple mobile termination components of the node, multiple transmit receive points of the node, multiple cells of the node, or a combination thereof (block 1110). For example, the control node (e.g., using receive processor 238, receive processor 258, controller/processor 240, controller/processor 280, memory 242, memory 282, and/or the like) may receive an indication of a capability of a node in the wireless network for simultaneous communication with respect to at least one of: multiple parent nodes of the node, multiple mobile termination components of the node, multiple transmit receive points of the node, or a combination thereof, as described above.

As further shown in FIG. 11, in some aspects, process 1100 may include communicating with the node based at least in part on the capability (block 1120). For example, the control node (e.g., using transmit processor 220, transmit processor 264, receive processor 238, receive processor 258, controller/processor 240, controller/processor 280, memory 242, memory 282, and/or the like) may communicate with the node based at least in part on the capability, as described above.

Process 1100 may include additional aspects, such as any single aspect or any combination of aspects described below and/or in connection with one or more other processes described elsewhere herein.

In a first aspect, the control node is a parent node of the node or is a central unit in the wireless network.

In a second aspect, alone or in combination with the first aspect, the indication of the capability is received from the node, is received via one or more parent nodes of the node, or is received from a central unit in the wireless network.

In a third aspect, alone or in combination with one or more of the first and second aspects, communicating with the node based at least in part on the capability comprises transmitting a configuration or a resource allocation to the node based at least in part on the capability.

In a fourth aspect, alone or in combination with one or more of the first through third aspects, the configuration or the resource allocation is transmitted to the node based at least in part on receiving the configuration or the resource allocation from a central unit in the wireless network.

In a fifth aspect, alone or in combination with one or more of the first through fourth aspects, the capability is for simultaneous communication using a single radio access technology.

In a sixth aspect, alone or in combination with one or more of the first through fifth aspects, the capability is for simultaneous communication using multiple radio access technologies.

In a seventh aspect, alone or in combination with one or more of the first through sixth aspects, the indication of the capability indicates at least one of: whether the node supports simultaneous transmission to multiple parent nodes of the node, whether the node supports simultaneous reception from multiple parent nodes of the node, whether the node supports simultaneous transmission to a first parent node of the node and reception from a second parent of the node, or a combination thereof.

In an eighth aspect, alone or in combination with one or more of the first through seventh aspects, the capability of the node for simultaneous communication with respect to multiple parent nodes of the node is a capability of the node for simultaneous communication with two parent nodes of the node.

In a ninth aspect, alone or in combination with one or more of the first through eighth aspects, the capability of the node for simultaneous communication with respect to multiple parent nodes of the node is a capability of the node for simultaneous communication with more than two parent nodes of the node.

In a tenth aspect, alone or in combination with one or more of the first through ninth aspects, the indication of the capability is for a subset of parent nodes of the more than two parent nodes.

In an eleventh aspect, alone or in combination with one or more of the first through tenth aspects, the indication of the capability for simultaneous communication identifies the multiple parent nodes with which the node is capable of simultaneous communication.

In a twelfth aspect, alone or in combination with one or more of the first through eleventh aspects, the indication of the capability indicates at least one of: whether the node supports simultaneous transmission by multiple mobile termination components of the node, whether the node supports simultaneous reception by multiple mobile termination components of the node, whether the node supports simultaneous transmission by a first mobile termination component of the node and reception by a second mobile termination component of the node, or a combination thereof.

In a thirteenth aspect, alone or in combination with one or more of the first through twelfth aspects, the capability of the node for simultaneous communication with respect to multiple mobile termination components of the node is a capability of the node for simultaneous communication using two mobile termination components of the node.

In a fourteenth aspect, alone or in combination with one or more of the first through thirteenth aspects, the capability of the node for simultaneous communication with respect to multiple mobile termination components of the node is a capability of the node for simultaneous communication using more than two mobile termination components of the node.

In a fifteenth aspect, alone or in combination with one or more of the first through fourteenth aspects, the indication of the capability is for a subset of mobile termination components of the more than two mobile termination components.

In a sixteenth aspect, alone or in combination with one or more of the first through fifteenth aspects, the indication of the capability for simultaneous communication identifies the multiple mobile termination components that the node is capable of using for simultaneous communication.

In a seventeenth aspect, alone or in combination with one or more of the first through sixteenth aspects, the indication of the capability indicates at least one of: whether the node supports simultaneous transmission by multiple transmit receive points of the node, whether the node supports simultaneous reception by multiple transmit receive points of the node, whether the node supports simultaneous transmission by a first transmit receive point of the node and reception by a second transmit receive point of the node, or a combination thereof.

In an eighteenth aspect, alone or in combination with one or more of the first through seventeenth aspects, the indication of the capability indicates at least one of: whether the node supports simultaneous communication by a mobile termination component of the node and a transmit receive point of a distributed unit of the node, whether the node supports simultaneous communication by a distributed unit of the node and a transmit receive point of a mobile termination component of the node, whether the node supports simultaneous communication by a transmit receive point of a distributed unit of the node and a transmit receive point of a mobile termination component of the node, whether the node supports simultaneous communication by a first transmit receive point of a mobile termination component of the node and a second transmit receive point of the mobile termination component of the node, whether the node supports simultaneous communication by a first transmit receive point of a distributed unit of the node and a second transmit receive point of the distributed unit of the node, or a combination thereof.

In a nineteenth aspect, alone or in combination with one or more of the first through eighteenth aspects, the multiple transmit receive points of the node include at least one of: multiple transmit receive points of a mobile termination component of the node, multiple transmit receive points of a distributed unit component of the node, a first transmit receive point of a mobile termination component of the node and a second transit receive point of a distributed unit component of the node, or a combination thereof.

In a twentieth aspect, alone or in combination with one or more of the first through nineteenth aspects, the capability of the node for simultaneous communication with respect to multiple transmit receive points of the node is a capability of the node for simultaneous communication using two transmit receive points of the node.

In a twenty-first aspect, alone or in combination with one or more of the first through twentieth aspects, the capability of the node for simultaneous communication with respect to multiple transmit receive points of the node is a capability of the node for simultaneous communication using more than two transmit receive points of the node.

In a twenty-second aspect, alone or in combination with one or more of the first through twenty-first aspects, the indication of the capability is for a subset of transmit receive points of the more than two transmit receive points.

In a twenty-third aspect, alone or in combination with one or more of the first through twenty-second aspects, the indication of the capability for simultaneous communication identifies the transmit receive points that the node is capable of using for simultaneous communication.

In a twenty-fourth aspect, alone or in combination with one or more of the first through twenty-third aspects, the indication of the capability of the node for simultaneous communication is for at least one of: all combinations of parent nodes of the node, all combinations of mobile termination components of the node, all combinations of transmit receive points of the node, all combinations of cells of the node, or a combination thereof.

In a twenty-fifth aspect, alone or in combination with one or more of the first through twenty-fourth aspects, the indication of the capability of the node for simultaneous communication is received based at least in part on a report configuration transmitted to the node by the control node.

In a twenty-sixth aspect, alone or in combination with one or more of the first through twenty-fifth aspects, the report configuration indicates at least one of: a combination of parent nodes of the node for which the capability of the node for simultaneous communication is to be reported, a combination of mobile termination components of the node for which the capability of the node for simultaneous communication is to be reported, a combination of transmit receive points of the node for which the capability of the node for simultaneous communication is to be reported, or a combination thereof.

In a twenty-seventh aspect, alone or in combination with one or more of the first through twenty-sixth aspects, the indication of the capability of the node for simultaneous communication is received periodically, is received according to a report configuration, is received based at least in part on a dynamic request, or is received based at least in part on a triggering event.

In a twenty-eighth aspect, alone or in combination with one or more of the first through twenty-seventh aspects, the capability of the node for simultaneous communication is subject to a condition.

In a twenty-ninth aspect, alone or in combination with one or more of the first through twenty-eighth aspects, the indication of the capability of the node for simultaneous communication includes an indication of whether the capability is conditional or unconditional.

In a thirtieth aspect, alone or in combination with one or more of the first through twenty-ninth aspects, the indication of whether the capability is conditional or unconditional is a single bit.

In a thirty-first aspect, alone or in combination with one or more of the first through thirtieth aspects, the indication of whether the capability is conditional or unconditional includes an indication of a condition to which the simultaneous communication is subject.

In a thirty-second aspect, alone or in combination with one or more of the first through thirty-first aspects, process 1100 includes transmitting a configuration or a resource allocation based at least in part on the indication of the capability; and receiving an indication of whether the node supports the configuration or the resource allocation based at least in part on a condition associated with the simultaneous communication.

In a thirty-third aspect, alone or in combination with one or more of the first through thirty-second aspects, process 1100 includes transmitting downlink control information that indicates a first set of resources scheduled for the node for communication with a first parent node of the node; and receiving, in uplink control information, an indication that the node is not capable of communicating using the first set of resources.

In a thirty-fourth aspect, alone or in combination with one or more of the first through thirty-third aspects, the node is a user equipment or an integrated access and backhaul node.

In a thirty-fifth aspect, alone or in combination with one or more of the first through thirty-fourth aspects, the indication of the capability indicates at least one of: whether the node supports simultaneous transmission via multiple cells of the node, whether the node supports simultaneous reception via multiple cells of the node, whether the node supports simultaneous transmission by a first cell of the node and reception by a second cell of the node, or a combination thereof.

In a thirty-sixth aspect, alone or in combination with one or more of the first through thirty-fifth aspects, the cells of the node include at least one of: multiple cells of a distributed unit component of the node, multiple cells corresponding to multiple transmit receive points of a distributed unit component of the node, or a combination thereof.

In a thirty-seventh aspect, alone or in combination with one or more of the first through thirty-sixth aspects, the capability of the node for simultaneous communication with respect to multiple cells of the node is a capability of the node for simultaneous communication using two cells of the node.

In a thirty-eighth aspect, alone or in combination with one or more of the first through thirty-seventh aspects, the capability of the node for simultaneous communication with respect to multiple cells of the node is a capability of the node for simultaneous communication using more than two cells of the node.

In a thirty-ninth aspect, alone or in combination with one or more of the first through thirty-eighth aspects, the indication of the capability is for a subset of cells of the more than two cells.

In a fortieth aspect, alone or in combination with one or more of the first through thirty-ninth aspects, the indication of the capability for simultaneous communication identifies the cells that the node is capable of using for simultaneous communication.

In a forty-first aspect, alone or in combination with one or more of the first through fortieth aspects, the indication of the capability for simultaneous communication identifies the cells that the node is not capable of using for simultaneous communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of aspects of the present disclosure:

Aspect 1: A method of wireless communication performed by a node in a wireless network, comprising: transmitting an indication of a capability of the node for simultaneous communication with respect to at least one of: multiple parent nodes of the node, multiple mobile termination components of the node, multiple transmit receive points of the node, multiple cells of the node, or a combination thereof; and communicating with another node in the wireless network based at least in part on the capability.

Aspect 2: The method of aspect 1, wherein the capability is for simultaneous communication using a single radio access technology.

Aspect 3: The method of aspect 1, wherein the capability is for simultaneous communication using multiple radio access technologies.

Aspect 4: The method of any of the preceding aspects, wherein communicating with another node in the wireless network based at least in part on the capability comprises receiving at least one of a configuration or a resource allocation based at least in part on the capability.

Aspect 5: The method of aspect 4, wherein the configuration or the resource allocation is received from a parent node of the node or from a central unit in the wireless network.

Aspect 6: The method of any of the preceding aspects, wherein the indication of the capability of the node for simultaneous communication is transmitted to a parent node of the node or to a central unit in the wireless network.

Aspect 7: The method of any of the preceding aspects, wherein the indication of the capability indicates at least one of: whether the node supports simultaneous transmission to multiple parent nodes of the node, whether the node supports simultaneous reception from multiple parent nodes of the node, whether the node supports simultaneous transmission to a first parent node of the node and reception from a second parent of the node, or a combination thereof.

Aspect 8: The method of any of the preceding aspects, wherein the capability of the node for simultaneous communication with respect to multiple parent nodes of the node is a capability of the node for simultaneous communication with two parent nodes of the node.

Aspect 9: The method of any of aspects 1-7, wherein the capability of the node for simultaneous communication with respect to multiple parent nodes of the node is a capability of the node for simultaneous communication with more than two parent nodes of the node.

Aspect 10: The method of aspect 9, wherein the indication of the capability is for a subset of parent nodes of the more than two parent nodes.

Aspect 11: The method of any of the preceding aspects, wherein the indication of the capability for simultaneous communication identifies the multiple parent nodes with which the node is capable of simultaneous communication.

Aspect 12: The method of any of the preceding aspects, wherein the indication of the capability indicates at least one of: whether the node supports simultaneous transmission by multiple mobile termination components of the node, whether the node supports simultaneous reception by multiple mobile termination components of the node, whether the node supports simultaneous transmission by a first mobile termination component of the node and reception by a second mobile termination component of the node, or a combination thereof.

Aspect 13: The method of any of the preceding aspects, wherein the capability of the node for simultaneous communication with respect to multiple mobile termination components of the node is a capability of the node for simultaneous communication using two mobile termination components of the node.

Aspect 14: The method of any of aspects 1-12, wherein the capability of the node for simultaneous communication with respect to multiple mobile termination components of the node is a capability of the node for simultaneous communication using more than two mobile termination components of the node.

Aspect 15: The method of aspect 14, wherein the indication of the capability is for a subset of mobile termination components of the more than two mobile termination components.

Aspect 16: The method of any of the preceding aspects, wherein the indication of the capability for simultaneous communication identifies the multiple mobile termination components that the node is capable of using for simultaneous communication.

Aspect 17: The method of any of the preceding aspects, wherein the indication of the capability indicates at least one of: whether the node supports simultaneous transmission by multiple transmit receive points of the node, whether the node supports simultaneous reception by multiple transmit receive points of the node, whether the node supports simultaneous transmission by a first transmit receive point of the node and reception by a second transmit receive point of the node, or a combination thereof.

Aspect 18: The method of any of the preceding aspects, wherein the indication of the capability indicates at least one of: whether the node supports simultaneous communication by a mobile termination component of the node and a transmit receive point of a distributed unit of the node, whether the node supports simultaneous communication by a distributed unit of the node and a transmit receive point of a mobile termination component of the node, whether the node supports simultaneous communication by a transmit receive point of a distributed unit of the node and a transmit receive point of a mobile termination component of the node, whether the node supports simultaneous communication by a first transmit receive point of a mobile termination component of the node and a second transmit receive point of the mobile termination component of the node, whether the node supports simultaneous communication by a first transmit receive point of a distributed unit of the node and a second transmit receive point of the distributed unit of the node, or a combination thereof.

Aspect 19: The method of any of the preceding aspects, wherein the multiple transmit receive points of the node include at least one of: multiple transmit receive points of a mobile termination component of the node, multiple transmit receive points of a distributed unit component of the node, a first transmit receive point of a mobile termination component of the node and a second transit receive point of a distributed unit component of the node, or a combination thereof.

Aspect 20: The method of any of the preceding aspects, wherein the capability of the node for simultaneous communication with respect to multiple transmit receive points of the node is a capability of the node for simultaneous communication using two transmit receive points of the node.

Aspect 21: The method of any of aspects 1-19, wherein the capability of the node for simultaneous communication with respect to multiple transmit receive points of the node is a capability of the node for simultaneous communication using more than two transmit receive points of the node.

Aspect 22: The method of aspect 21, wherein the indication of the capability is for a subset of transmit receive points of the more than two transmit receive points.

Aspect 23: The method of any of the preceding aspects, wherein the indication of the capability for simultaneous communication identifies the transmit receive points that the node is capable of using for simultaneous communication.

Aspect 24: The method of any of the preceding aspects, wherein the indication of the capability indicates at least one of: whether the node supports simultaneous transmission via multiple cells of the node, whether the node supports simultaneous reception via multiple cells of the node, whether the node supports simultaneous transmission by a first cell of the node and reception by a second cell of the node, or a combination thereof.

Aspect 25: The method of any of the preceding aspects, wherein the cells of the node include at least one of: multiple cells of a distributed unit component of the node, multiple cells corresponding to multiple transmit receive points of a distributed unit component of the node, or a combination thereof.

Aspect 26: The method of any of the preceding aspects, wherein the capability of the node for simultaneous communication with respect to multiple cells of the node is a capability of the node for simultaneous communication using two cells of the node.

Aspect 27: The method of any of aspects 1-25, wherein the capability of the node for simultaneous communication with respect to multiple cells of the node is a capability of the node for simultaneous communication using more than two cells of the node.

Aspect 28: The method of aspect 27, wherein the indication of the capability is for a subset of cells of the more than two cells.

Aspect 29: The method of any of the preceding aspects, wherein the indication of the capability for simultaneous communication identifies the cells that the node is capable of using for simultaneous communication.

Aspect 30: The method of any of the preceding aspects, wherein the indication of the capability for simultaneous communication identifies the cells that the node is not capable of using for simultaneous communication.

Aspect 31: The method of any of the preceding aspects, wherein the indication of the capability of the node for simultaneous communication is for at least one of: all combinations of parent nodes of the node, all combinations of mobile termination components of the node, all combinations of transmit receive points of the node, all combinations of cells of the node, or a combination thereof.

Aspect 32: The method of any of the preceding aspects, wherein the indication of the capability of the node for simultaneous communication is transmitted based at least in part on a report configuration received by the node.

Aspect 33: The method of aspect 32, wherein the report configuration is received from a parent node of the node or from a central unit in the wireless network.

Aspect 34: The method of any of aspects 32-33, wherein the report configuration indicates at least one of: a combination of parent nodes of the node for which the capability of the node for simultaneous communication is to be reported, a combination of mobile termination components of the node for which the capability of the node for simultaneous communication is to be reported, a combination of transmit receive points of the node for which the capability of the node for simultaneous communication is to be reported, or a combination thereof.

Aspect 35: The method of any of the preceding aspects, wherein the indication of the capability of the node for simultaneous communication is transmitted periodically, is transmitted according to a report configuration, is transmitted based at least in part on a dynamic request, or is transmitted based at least in part on detecting a triggering event.

Aspect 36: The method of any of the preceding aspects, wherein the capability of the node for simultaneous communication is subject to a condition.

Aspect 37: The method of any of the preceding aspects, wherein the indication of the capability of the node for simultaneous communication includes an indication of whether the capability is conditional or unconditional.

Aspect 38: The method of aspect 37, wherein the indication of whether the capability is conditional or unconditional is a single bit.

Aspect 39: The method of aspect 37, wherein the indication of whether the capability is conditional or unconditional includes an indication of a condition to which the simultaneous communication is subject.

Aspect 40: The method of any of the preceding aspects, further comprising: receiving a configuration or a resource allocation based at least in part on the indication of the capability; and transmitting an indication of whether the node supports the configuration or the resource allocation based at least in part on a condition associated with the simultaneous communication.

Aspect 41: The method of any of the preceding aspects, further comprising: receiving downlink control information that indicates a first set of resources scheduled for the node for communication with a first parent node of the node; determining that the first set of resources conflicts with a second set of resources scheduled for the node for communication with a second parent node of the node due to a condition associated with capability for the simultaneous communication; and transmitting, in uplink control information, an indication that the node is not capable of communicating using the first set of resources based at least in part on the determination.

Aspect 42: The method of any of the preceding aspects, wherein the node is a user equipment or an integrated access and backhaul node.

Aspect 43: A method of wireless communication performed by a control node in a wireless network, comprising: receiving an indication of a capability of a node in the wireless network for simultaneous communication with respect to at least one of: multiple parent nodes of the node, multiple mobile termination components of the node, multiple transmit receive points of the node, multiple cells of the node, or a combination thereof; and communicating with the node based at least in part on the capability.

Aspect 44: The method of aspect 43, wherein the control node is a parent node of the node or is a central unit in the wireless network.

Aspect 45: The method of any of aspects 43-44, wherein the indication of the capability is received from the node, is received via one or more parent nodes of the node, or is received from a central unit in the wireless network.

Aspect 46: The method of any of aspects 43-45, wherein communicating with the node based at least in part on the capability comprises transmitting a configuration or a resource allocation to the node based at least in part on the capability.

Aspect 47: The method of aspect 46, wherein the configuration or the resource allocation is transmitted to the node based at least in part on receiving the configuration or the resource allocation from a central unit in the wireless network.

Aspect 48: The method of any of aspects 43-47, wherein the capability is for simultaneous communication using a single radio access technology.

Aspect 49: The method of any of aspects 43-47, wherein the capability is for simultaneous communication using multiple radio access technologies.

Aspect 50: The method of any of aspects 43-49, wherein the indication of the capability indicates at least one of: whether the node supports simultaneous transmission to multiple parent nodes of the node, whether the node supports simultaneous reception from multiple parent nodes of the node, whether the node supports simultaneous transmission to a first parent node of the node and reception from a second parent of the node, or a combination thereof.

Aspect 51: The method of any of aspects 43-50, wherein the capability of the node for simultaneous communication with respect to multiple parent nodes of the node is a capability of the node for simultaneous communication with two parent nodes of the node.

Aspect 52: The method of any of aspects 43-50, wherein the capability of the node for simultaneous communication with respect to multiple parent nodes of the node is a capability of the node for simultaneous communication with more than two parent nodes of the node.

Aspect 53: The method of aspect 52, wherein the indication of the capability is for a subset of parent nodes of the more than two parent nodes.

Aspect 54: The method of any of aspects 43-53, wherein the indication of the capability for simultaneous communication identifies the multiple parent nodes with which the node is capable of simultaneous communication.

Aspect 55: The method of any of aspects 43-54, wherein the indication of the capability indicates at least one of: whether the node supports simultaneous transmission by multiple mobile termination components of the node, whether the node supports simultaneous reception by multiple mobile termination components of the node, whether the node supports simultaneous transmission by a first mobile termination component of the node and reception by a second mobile termination component of the node, or a combination thereof.

Aspect 56: The method of any of aspects 43-55, wherein the capability of the node for simultaneous communication with respect to multiple mobile termination components of the node is a capability of the node for simultaneous communication using two mobile termination components of the node.

Aspect 57: The method of any of aspects 43-55, wherein the capability of the node for simultaneous communication with respect to multiple mobile termination components of the node is a capability of the node for simultaneous communication using more than two mobile termination components of the node.

Aspect 58: The method of aspect 57, wherein the indication of the capability is for a subset of mobile termination components of the more than two mobile termination components.

Aspect 59: The method of any of aspects 43-58, wherein the indication of the capability for simultaneous communication identifies the multiple mobile termination components that the node is capable of using for simultaneous communication.

Aspect 60: The method of any of aspects 43-59, wherein the indication of the capability indicates at least one of: whether the node supports simultaneous transmission by multiple transmit receive points of the node, whether the node supports simultaneous reception by multiple transmit receive points of the node, whether the node supports simultaneous transmission by a first transmit receive point of the node and reception by a second transmit receive point of the node, or a combination thereof.

Aspect 61: The method of any of aspects 43-60, wherein the indication of the capability indicates at least one of: whether the node supports simultaneous communication by a mobile termination component of the node and a transmit receive point of a distributed unit of the node, whether the node supports simultaneous communication by a distributed unit of the node and a transmit receive point of a mobile termination component of the node, whether the node supports simultaneous communication by a transmit receive point of a distributed unit of the node and a transmit receive point of a mobile termination component of the node, whether the node supports simultaneous communication by a first transmit receive point of a mobile termination component of the node and a second transmit receive point of the mobile termination component of the node, whether the node supports simultaneous communication by a first transmit receive point of a distributed unit of the node and a second transmit receive point of the distributed unit of the node, or a combination thereof.

Aspect 62: The method of any of aspects 43-61, wherein the multiple transmit receive points of the node include at least one of: multiple transmit receive points of a mobile termination component of the node, multiple transmit receive points of a distributed unit component of the node, a first transmit receive point of a mobile termination component of the node and a second transit receive point of a distributed unit component of the node, or a combination thereof.

Aspect 63: The method of any of aspects 43-62, wherein the capability of the node for simultaneous communication with respect to multiple transmit receive points of the node is a capability of the node for simultaneous communication using two transmit receive points of the node.

Aspect 64: The method of any of aspects 43-62, wherein the capability of the node for simultaneous communication with respect to multiple transmit receive points of the node is a capability of the node for simultaneous communication using more than two transmit receive points of the node.

Aspect 65: The method of aspect 64, wherein the indication of the capability is for a subset of transmit receive points of the more than two transmit receive points.

Aspect 66: The method of any of aspects 43-65, wherein the indication of the capability for simultaneous communication identifies the transmit receive points that the node is capable of using for simultaneous communication.

Aspect 67: The method of any of aspects 43-66, wherein the indication of the capability of the node for simultaneous communication is for at least one of: all combinations of parent nodes of the node, all combinations of mobile termination components of the node, all combinations of transmit receive points of the node, all combinations of cells of the node, or a combination thereof.

Aspect 68: The method of any of aspects 43-67, wherein the indication of the capability of the node for simultaneous communication is received based at least in part on a report configuration transmitted to the node by the control node.

Aspect 69: The method of aspect 68, wherein the report configuration indicates at least one of: a combination of parent nodes of the node for which the capability of the node for simultaneous communication is to be reported, a combination of mobile termination components of the node for which the capability of the node for simultaneous communication is to be reported, a combination of transmit receive points of the node for which the capability of the node for simultaneous communication is to be reported, or a combination thereof.

Aspect 70: The method of any of aspects 43-69, wherein the indication of the capability of the node for simultaneous communication is received periodically, is received according to a report configuration, is received based at least in part on a dynamic request, or is received based at least in part on a triggering event.

Aspect 71: The method of any of aspects 43-70, wherein the capability of the node for simultaneous communication is subject to a condition.

Aspect 72: The method of any of aspects 43-71, wherein the indication of the capability of the node for simultaneous communication includes an indication of whether the capability is conditional or unconditional.

Aspect 73: The method of aspect 72, wherein the indication of whether the capability is conditional or unconditional is a single bit.

Aspect 74: The method of aspect 72, wherein the indication of whether the capability is conditional or unconditional includes an indication of a condition to which the simultaneous communication is subject.

Aspect 75: The method of any of aspects 43-74, further comprising: transmitting a configuration or a resource allocation based at least in part on the indication of the capability; and receiving an indication of whether the node supports the configuration or the resource allocation based at least in part on a condition associated with the simultaneous communication.

Aspect 76: The method of any of aspects 43-75, further comprising: transmitting downlink control information that indicates a first set of resources scheduled for the node for communication with a first parent node of the node; and receiving, in uplink control information, an indication that the node is not capable of communicating using the first set of resources.

Aspect 77: The method of any of aspects 43-76, wherein the node is a user equipment or an integrated access and backhaul node.

Aspect 78: The method of any of aspects 43-77, wherein the indication of the capability indicates at least one of: whether the node supports simultaneous transmission via multiple cells of the node, whether the node supports simultaneous reception via multiple cells of the node, whether the node supports simultaneous transmission by a first cell of the node and reception by a second cell of the node, or a combination thereof.

Aspect 79: The method of any of aspects 43-78, wherein the cells of the node include at least one of: multiple cells of a distributed unit component of the node, multiple cells corresponding to multiple transmit receive points of a distributed unit component of the node, or a combination thereof.

Aspect 80: The method of any of aspects 43-79, wherein the capability of the node for simultaneous communication with respect to multiple cells of the node is a capability of the node for simultaneous communication using two cells of the node.

Aspect 81: The method of any of aspects 43-79, wherein the capability of the node for simultaneous communication with respect to multiple cells of the node is a capability of the node for simultaneous communication using more than two cells of the node.

Aspect 82: The method of aspect 81, wherein the indication of the capability is for a subset of cells of the more than two cells.

Aspect 83: The method of any of aspects 43-82, wherein the indication of the capability for simultaneous communication identifies the cells that the node is capable of using for simultaneous communication.

Aspect 84: The method of any of aspects 43-83, wherein the indication of the capability for simultaneous communication identifies the cells that the node is not capable of using for simultaneous communication.

Aspect 85: An apparatus for wireless communication at a device, comprising a processor; memory coupled with the processor; and instructions stored in the memory and executable by the processor to cause the apparatus to perform the method of one or more aspects of aspects 1-42.

Aspect 86: A device for wireless communication, comprising a memory and one or more processors coupled to the memory, the memory and the one or more processors configured to perform the method of one or more aspects of aspects 1-42.

Aspect 87: An apparatus for wireless communication, comprising at least one means for performing the method of one or more aspects of aspects 1-42.

Aspect 88: A non-transitory computer-readable medium storing code for wireless communication, the code comprising instructions executable by a processor to perform the method of one or more aspects of aspects 1-42.

Aspect 89: A non-transitory computer-readable medium storing a set of instructions for wireless communication, the set of instructions comprising one or more instructions that, when executed by one or more processors of a device, cause the device to perform the method of one or more aspects of aspects 1-42.

Aspect 90: An apparatus for wireless communication at a device, comprising a processor; memory coupled with the processor; and instructions stored in the memory and executable by the processor to cause the apparatus to perform the method of one or more aspects of aspects 43-84.

Aspect 91: A device for wireless communication, comprising a memory and one or more processors coupled to the memory, the memory and the one or more processors configured to perform the method of one or more aspects of aspects 43-84.

Aspect 92: An apparatus for wireless communication, comprising at least one means for performing the method of one or more aspects of aspects 43-84.

Aspect 93: A non-transitory computer-readable medium storing code for wireless communication, the code comprising instructions executable by a processor to perform the method of one or more aspects of aspects 43-84.

Aspect 94: A non-transitory computer-readable medium storing a set of instructions for wireless communication, the set of instructions comprising one or more instructions that, when executed by one or more processors of a device, cause the device to perform the method of one or more aspects of aspects 43-84.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A node for wireless communication in a wireless network, comprising:
- a memory; and
- one or more processors coupled to the memory, wherein the one or more processors are configured to:
  - transmit an indication of a capability of the node to simultaneously communicate with multiple parent nodes of the node, wherein the node comprises and integrated access and backhaul node, wherein the capability to simultaneously communicate comprises a support of simultaneous transmission and reception with multiple parent nodes of the node; and
  - communicate with another node in the wireless network based at least in part on the capability of the node to simultaneously communicate with multiple parent nodes of the node.

2. The node of claim 1, wherein the indication of the capability indicates at least one of:
- whether the node supports simultaneous transmission via multiple cells of the node,
- whether the node supports simultaneous reception via multiple cells of the node,
- whether the node supports simultaneous transmission by a first cell of the node and reception by a second cell of the node, or
- a combination thereof.

3. The node of claim 1, wherein a plurality of cells of the node includes at least one of:
- multiple cells of a distributed unit component of the node,
- multiple cells corresponding to multiple transmit receive points of a distributed unit component of the node, or
- a combination thereof.

4. The node of claim 1, wherein the indication of the capability identifies one or more cells that the node is capable of using for simultaneous communication.

5. The node of claim 1, wherein the indication of the capability indicates
- that the node supports simultaneous transmission and reception associated with multiple parent nodes of the node.

6. The node of claim 1, wherein the indication of the capability identifies the multiple parent nodes with which the node is capable of simultaneous communication.

7. The node of claim 1,
- wherein the indication of the capability indicates at least one of:
  - whether the node supports simultaneous transmission by multiple mobile termination components of the node, whether the node supports simultaneous reception by multiple mobile termination components of the node,
  - whether the node supports simultaneous transmission by a first mobile termination component of the node and reception by a second mobile termination component of the node, or
  - a combination thereof.

8. The node of claim 1, wherein the indication of the capability identifies a plurality of multiple mobile termination components that the node is capable of using for simultaneous communication.

9. The node of claim 1, wherein the indication of the capability indicates at least one of:
- whether the node supports simultaneous transmission by multiple transmit receive points of the node,
- whether the node supports simultaneous reception by multiple transmit receive points of the node,
- whether the node supports simultaneous transmission by a first transmit receive point of the node and reception by a second transmit receive point of the node, or
- a combination thereof.

10. The node of claim 1, wherein the indication of the capability indicates at least one of:
- whether the node supports simultaneous communication by a mobile termination component of the node and a transmit receive point of a distributed unit of the node,
- whether the node supports simultaneous communication by a distributed unit of the node and a transmit receive point of a mobile termination component of the node,
- whether the node supports simultaneous communication by a transmit receive point of a distributed unit of the node and a transmit receive point of a mobile termination component of the node,
- whether the node supports simultaneous communication by a first transmit receive point of a mobile termination component of the node and a second transmit receive point of the mobile termination component of the node,
- whether the node supports simultaneous communication by a first transmit receive point of a distributed unit of the node and a second transmit receive point of the distributed unit of the node, or a combination thereof.

11. The node of claim 1, wherein a plurality of multiple transmit receive points of the node includes at least one of:

multiple transmit receive points of a mobile termination component of the node, multiple transmit receive points of a distributed unit component of the node, a first transmit receive point of a mobile termination component of the node and a second transit receive point of a distributed unit component of the node, or a combination thereof.

12. The node of claim 1, wherein the indication of the capability identifies one or more transmit receive points that the node is capable of using for simultaneous communication.

13. The node of claim 1, wherein the indication of the capability of the node is for at least one of:

all combinations of parent nodes of the node, all combinations of mobile termination components of the node, all combinations of transmit receive points of the node, all combinations of cells of the node, or a combination thereof.

14. The node of claim 1, wherein the one or more processors, when communicating with another node in the wireless network based at least in part on the capability, are configured to receive at least one of a configuration or a resource allocation based at least in part on the capability.

15. The node of claim 1, wherein the indication of the capability of the node is transmitted based at least in part on a report configuration received by the node.

16. The node of claim 15, wherein the report configuration indicates at least one of:

a combination of parent nodes of the node for which the capability of the node is to be reported, a combination of mobile termination components of the node for which the capability of the node is to be reported, a combination of transmit receive points of the node for which the capability of the node is to be reported, or a combination thereof.

17. The node of claim 1, wherein the indication of the capability of the node includes an indication of whether the capability is conditional or unconditional.

18. The node of claim 17, wherein the indication of whether the capability is conditional or unconditional includes an indication of a condition to which the capability of the node to simultaneously communicate is subject.

19. The node of claim 1, wherein the one or more processors are further configured to:

receive a configuration or a resource allocation based at least in part on the indication of the capability; and transmit an indication of whether the node supports the configuration or the resource allocation based at least in part on a condition associated with the capability of the node to simultaneously communicate.

20. The node of claim 1, wherein the one or more processors are further configured to:

receive downlink control information that indicates a first set of resources scheduled for the node for communication with a first parent node of the node;

determine that the first set of resources conflicts with a second set of resources scheduled for the node for communication with a second parent node of the node due to a condition associated with the capability of the node to simultaneously communicate; and transmit, in uplink control information, an indication that the node is not capable of communicating using the first set of resources based at least in part on the determination.

21. A control node for wireless communication in a wireless network, comprising:

a memory; and one or more processors coupled to the memory, wherein the one or more processors are configured to:

receive an indication of a capability of a node in the wireless network to simultaneously communicate with multiple parent nodes of the node, wherein the node comprises an integrated access and backhaul node, wherein the capability to simultaneously communicate comprises a support of simultaneous transmission and reception with multiple parent nodes of the node; and communicate with the node based at least in part on the capability of the node to simultaneously communicate with multiple parent nodes of the node.

22. The control node of claim 21, wherein the indication of the capability indicates at least one of:

whether the node supports simultaneous transmission via multiple cells of the node, whether the node supports simultaneous reception via multiple cells of the node, whether the node supports simultaneous transmission by a first cell of the node and reception by a second cell of the node, or a combination thereof.

23. The control node of claim 21, wherein a plurality of cells of the node includes at least one of:

multiple cells of a distributed unit component of the node, multiple cells corresponding to multiple transmit receive points of a distributed unit component of the node, or a combination thereof.

24. The control node of claim 21, wherein the indication of the capability identifies a plurality of cells that the node is capable of using for simultaneous communication.

25. The control node of claim 21, wherein the indication of the capability indicates that the node supports simultaneous transmission and reception associated with multiple parent nodes of the node.

26. The control node of claim 21, wherein the indication of the capability identifies a plurality of multiple parent nodes with which the node is capable of simultaneous communication.

27. The control node of claim 21, wherein the indication of the capability indicates at least one of:

whether the node supports simultaneous transmission by multiple mobile termination components of the node, whether the node supports simultaneous reception by multiple mobile termination components of the node, whether the node supports simultaneous transmission by a first mobile termination component of the node and reception by a second mobile termination component of the node, or a combination thereof.

28. The control node of claim 21, wherein the indication of the capability indicates at least one of:

whether the node supports simultaneous transmission by multiple transmit receive points of the node, whether the node supports simultaneous reception by multiple transmit receive points of the node, whether the node supports simultaneous transmission by a first transmit receive point of the node and reception by a second transmit receive point of the node, or a combination thereof.

29. The control node of claim 21, wherein the indication of the capability indicates at least one of:

whether the node supports simultaneous communication by a mobile termination component of the node and a transmit receive point of a distributed unit of the node, whether the node supports simultaneous communication by a distributed unit of the node and a transmit receive point of a mobile termination component of the node, whether the node supports simultaneous communication by a transmit receive point of a distributed unit of the node and a transmit receive point of a mobile termination component of the node, whether the node supports simultaneous communication by a first transmit receive point of a mobile termination component of the node and a second transmit receive point of the mobile termination component of the node, whether the node supports simultaneous communication by a first transmit receive point of a distributed unit of the node and a second transmit receive point of the distributed unit of the node, or a combination thereof.

30. The control node of claim 21, wherein a plurality of multiple transmit receive points of the node includes at least one of:

multiple transmit receive points of a mobile termination component of the node, multiple transmit receive points of a distributed unit component of the node, a first transmit receive point of a mobile termination component of the node and a second transit receive point of a distributed unit component of the node, or a combination thereof.

31. The control node of claim 21, wherein the indication of the capability of the node is received based at least in part on a report configuration transmitted to the node by the control node.

32. The control node of claim 31, wherein the report configuration indicates at least one of:

a combination of parent nodes of the node for which the capability of the node is to be reported, a combination of mobile termination components of the node for which the capability of the node is to be reported, a combination of transmit receive points of the node for which the capability of the node is to be reported, or a combination thereof.

33. The control node of claim 21, wherein the one or more processors, when communicating with the node based at least in part on the capability, are configured to transmit a configuration or a resource allocation to the node based at least in part on the capability.

34. A method of wireless communication performed by a node in a wireless network, comprising:

transmitting an indication of a capability of the node to simultaneously communicate with multiple parent nodes of the node, wherein the node comprises an integrated access and backhaul node, wherein the capability to simultaneously communicate comprises a support of simultaneous transmission and reception with multiple parent nodes of the node; and communicating with another node in the wireless network based at least in part on the capability of the node to simultaneously communicate with multiple parent nodes of the node.

35. A method of wireless communication performed by a control node in a wireless network, comprising:

receiving an indication of a capability of a node in the wireless network to simultaneously communicate with multiple parent nodes of the node, wherein the node comprises an integrated access and backhaul node, wherein the capability to simultaneously communicate comprises a support of simultaneous transmission and reception with multiple parent nodes of the node; and communicating with the node based at least in part on the capability of the node to simultaneously communicate with multiple parent nodes of the node.

* * * * *